United States Patent
Hoya

(10) Patent No.: US 7,863,368 B2
(45) Date of Patent: Jan. 4, 2011

(54) PROPYLENE RESIN COMPOSITION, PROCESS FOR PRODUCING PROPYLENE RESIN COMPOSITION, PROPYLENE POLYMER COMPOSITION, SHAPED ARTICLE PRODUCED OF THE PROPYLENE RESIN COMPOSITION, AND ELECTRIC WIRE

(75) Inventor: Hiroshi Hoya, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/312,417

(22) PCT Filed: Nov. 8, 2007

(86) PCT No.: PCT/JP2007/071690

§ 371 (c)(1),
(2), (4) Date: May 8, 2009

(87) PCT Pub. No.: WO2008/059746

PCT Pub. Date: May 22, 2008

(65) Prior Publication Data

US 2010/0056691 A1    Mar. 4, 2010

(30) Foreign Application Priority Data

Nov. 17, 2006   (JP) ................ 2006-312232

(51) Int. Cl.
  *C08K 3/18* (2006.01)
  *C08K 3/22* (2006.01)
  *C08J 5/00* (2006.01)
  *C08L 7/00* (2006.01)

(52) U.S. Cl. .............. 524/430; 524/424; 524/528

(58) Field of Classification Search ........... 524/424
  See application file for complete search history.

(56) References Cited

U.S. PATENT DOCUMENTS

| 5,321,106 | A | 6/1994 | LaPointe |
| 6,232,420 | B1 | 5/2001 | Turner |
| 2005/0113473 | A1* | 5/2005 | Wada ........... 521/143 |
| 2005/0256273 | A1 | 11/2005 | Imai |
| 2006/0247381 | A1 | 11/2006 | Mori et al. |
| 2007/0251572 | A1* | 11/2007 | Hoya et al. ........... 136/256 |
| 2008/0023215 | A1 | 1/2008 | Uehara et al. |

FOREIGN PATENT DOCUMENTS

| EP | 1 501 103 A1 | 1/2005 |
| EP | 2 048 194 A1 | 4/2009 |
| JP | 1-501950 | 7/1989 |
| JP | 2000-344975 A | 12/2000 |
| JP | 2001-106841 A | 4/2001 |
| JP | 2002-97228 A | 4/2002 |
| JP | 2002-97323 A | 4/2002 |
| JP | 2002-97325 A | 4/2002 |
| JP | 2003-313377 | 11/2003 |
| JP | 2004-107490 | 4/2004 |
| JP | 2006-241225 A | 9/2006 |
| JP | 2007-321098 | 12/2007 |
| WO | WO 2004/020517 A1 | 3/2004 |
| WO | WO 2004/087775 A1 | 10/2004 |
| WO | WO 2004/106430 A1 | 12/2004 |
| WO | WO 2005/103141 A1 | 11/2005 |
| WO | WO 2006/057361 A1 | 6/2006 |
| WO | WO 2006/123759 A1 | 11/2006 |
| WO | WO 2007/116708 A1 | 10/2007 |

OTHER PUBLICATIONS

European Search Report dated Sep. 30, 2009, in European Appln No. 07831421.8.

* cited by examiner

*Primary Examiner*—James Seidleck
*Assistant Examiner*—Deve Valdez
(74) *Attorney, Agent, or Firm*—Foley & Lardner LLP

(57) ABSTRACT

A propylene resin composition includes 0 to 80 wt % of a propylene polymer (A) having a DSC melting point of not less than 100° C., 5 to 85 wt % of a specific soft propylene copolymer (B), 0 to 40 wt % of one or more elastomers (C) selected from ethylene elastomers (C1) and styrene elastomers (C2), and 15 to 80 wt % of an inorganic filler (D) (the total of (A), (B), (C) and (D) is 100 wt %) The propylene resin composition contains the inorganic filler at a high proportion and shows excellent flexibility as well as high breaking elongation, low-temperature properties, whitening resistance, scratch resistance, abrasion resistance, stress absorption properties and flame retardancy.

14 Claims, 2 Drawing Sheets

PROPYLENE RESIN COMPOSITION, PROCESS FOR PRODUCING PROPYLENE RESIN COMPOSITION, PROPYLENE POLYMER COMPOSITION, SHAPED ARTICLE PRODUCED OF THE PROPYLENE RESIN COMPOSITION, AND ELECTRIC WIRE

FIELD OF THE INVENTION

The present invention relates to propylene resin compositions and shaped articles of the compositions.

BACKGROUND OF THE INVENTION

Polypropylene resins surpass polyethylene resins (polyethylene elastomers) in heat resistance, mechanical strength, scratch resistance and abrasion resistance, and shaped articles thereof are used widely. Shaped articles containing polypropylene and an inorganic filler generally have good heat resistance and mechanical strength but are poor in flexibility and impact resistance. Therefore, polyethylene resins are usually used in applications requiring properties such as flexibility and impact resistance. However, shaped articles of polyethylene resins have low scratch resistance.

Known shaped articles containing a polypropylene resin and an inorganic filler (flame-retardant) are electric wires and wire harnesses which require scratch resistance. Patent Document 1 discloses automobile insulating electric wires containing a specific propylene polymer. The shaped articles of Patent Document 1 have high flexibility and impact resistance, but their scratch resistance is insufficient.

Generally, polypropylene resin shaped articles show high elasticity when folded, in other words, they do not have bendability (stress absorption) like polyvinyl chloride shaped articles. This tendency is due to characteristics of the polypropylene resins, and it is very difficult that conventional materials achieve improved bendability (stress absorption).

Patent Document 1: JP-A-2003-313377

DISCLOSURE OF THE INVENTION

It is an object of the present invention to provide propylene resin compositions that contain inorganic fillers at high concentrations and have excellent flexibility, mechanical strength, breaking elongation, heat resistance, low-temperature properties (low brittle temperature, low-temperature impact resistance), scratch resistance, abrasion resistance, whitening resistance, stress absorption properties and flame retardancy. It is another object of the invention to provide processes for producing propylene resin compositions excellent in flexibility, mechanical strength, breaking elongation, heat resistance, low-temperature properties (low brittle temperature, low-temperature impact resistance), whitening resistance and flame retardancy and improved in scratch resistance, abrasion resistance and stress absorption properties. It is another object of the invention to provide propylene polymer compositions suitably used in the production of the propylene resin compositions. It is still another object of the invention that shaped articles are obtained from the compositions, and electric wires having an insulator and/or a sheath from the composition are provided.

The present inventors diligently studied and have developed propylene resin compositions that contain a specific propylene polymer and a specific soft propylene polymer whereby an inorganic filler is favorably incorporated in the composition and the composition surpasses conventional compositions of ethylene or propylene materials and inorganic fillers in breaking elongation, heat resistance, whitening resistance, scratch resistance, abrasion resistance and stress absorption properties while ensuring high flexibility. It has been also found that the propylene resin compositions containing a specific soft propylene polymer give shaped articles having excellent flexibility, mechanical strength, breaking elongation, heat resistance, low-temperature properties, scratch resistance, abrasion resistance, whitening resistance, stress absorption properties and flame retardancy.

A propylene resin composition according to the present invention comprises:

(A) 0 to 80 wt % of a propylene polymer satisfying the requirement (a) below;

(B) 5 to 85 wt % of a soft propylene copolymer satisfying the requirement (b) below;

(c) 0 to 40 wt % of one or more elastomers selected from ethylene elastomers (C1) and styrene elastomers (C2); and (D) 15 to 80 wt % of an inorganic filler (wherein the total of (A), (B), (C) and (D) is 100 wt %):

(a) the melting point according to differential scanning calorimetry is not less than 100° C.;

(b) MFR measured at 230° C. under 2.16 kg load in accordance with ASTM D 1238 is in the range of 0.01 to 100 g/10 min, and at least one of the requirements (b-1) and (b-2) is satisfied:

(b-1) the syndiotactic triad fraction (rr fraction) as measured by $^{13}$C-NMR is not less than 60%; and (b-2) the copolymer contains 55 to 90 mol % of structural units derived from propylene and 10 to 45 mol % of structural units derived from at least one olefin selected from C2-20 α-olefins (excluding propylene) (with the proviso that the total of the structural units derived from propylene and the structural units derived from the C2-20 α-olefin(s) (excluding propylene) is 100 mol %), and an intrinsic viscosity [η] (dL/g) as measured in decalin at 135° C. and the MFR (g/10 min, 230° C., 2.16 kg load) satisfy the following relationship:

$$1.50 \times MFR^{(-0.20)} \leq [\eta] \leq 2.65 \times MFR^{(-0.20)}.$$

The propylene polymer (A) may be an isotactic propylene polymer (A1) or a syndiotactic propylene polymer (A2).

The syndiotactic propylene polymer (A2) preferably has a melting point of not less than 145° C.

The inorganic filler (D) is preferably at least one selected from metal hydroxides, metal carbonates and metal oxides.

The propylene resin composition preferably contains 0.1 to 20 parts by weight of an oil (E), or preferably contains 0.1 to 30 parts by weight of a graft modified polymer (F) that is grafted with 0.01 to 10 wt % of a vinyl compound having a polar group (based on 100 wt % of the graft modified polymer), based on 100 parts by weight of the total of the propylene polymer (A), the soft propylene copolymer (B), the elastomer (C) and the inorganic filler (D).

A process for producing propylene resin compositions according to the present invention comprises: melt kneading the soft propylene copolymer (B) and the graft modified polymer (F) to produce a propylene polymer composition (G); and melt kneading the propylene polymer composition (G) with the inorganic filler (D) and optionally with the propylene polymer (A) and optionally with the elastomer (C).

The propylene resin composition of the invention is preferably obtained by the process of the invention.

A propylene resin composition according to the present invention is produced by melt kneading:

(A) 0 to 80 wt % of a propylene polymer satisfying the requirement (a) below;

(B) 5 to 85 wt % of a soft propylene copolymer satisfying the requirement (b) below;

(C) 0 to 40 wt % of one or more elastomers selected from ethylene elastomers (C1) and styrene elastomers (C2); and (D) 15 to 80 wt % of an inorganic filler (wherein the total of (A), (B), (C) and (D) is 100 wt %):

(a) the melting point according to differential scanning calorimetry is not less than 100° C.;

(b) MFR measured at 230° C. under 2.16 kg load in accordance with ASTM D 1238 is in the range of 0.01 to 100 g/10 min, and at least one of the requirements (b-1) and (b-2) is satisfied:

(b-1) the syndiotactic triad fraction (rr fraction) as measured by $^{13}$C-NMR is not less than 60%; and (b-2) the copolymer contains 55 to 90 mol % of structural units derived from propylene and 10 to 45 mol % of structural units derived from at least one olefin selected from C2-20 α-olefins (excluding propylene) (with the proviso that the total of the structural units derived from propylene and the structural units derived from the C2-20 α-olefin(s) (excluding propylene) is 100 mol %), and an intrinsic viscosity [η] (dL/g) as measured in decalin at 135° C. and the MFR (g/10 min, 230° C., 2.16 kg load) satisfy the following relationship:

$$1.50 \times MFR^{(-0.20)} \leq [\eta] \leq 2.65 \times MFR^{(-0.20)}.$$

A propylene polymer composition (G') according to the present invention comprises 99 to 14 parts by weight of the soft propylene copolymer (B) and 1 to 86 parts by weight of the graft modified polymer (F), and preferably comprises 99 to 50 parts by weight of the soft propylene copolymer (B) and 1 to 50 parts by weight of the graft modified polymer (F).

A shaped article according to the present invention comprises the propylene resin composition as described above.

The shaped article is preferably an electric wire insulator or an electric wire sheath.

An electric wire according to the present invention comprises an insulator comprising the propylene resin composition and/or a sheath comprising the propylene resin composition.

The electric wire is preferably an automotive electric wire or an appliance electric wire.

ADVANTAGES OF THE INVENTION

The propylene resin compositions of the invention contain the inorganic fillers at high proportions and show high flexibility as well as excellent breaking elongation, low-temperature properties, whitening resistance, scratch resistance, abrasion resistance, stress absorption properties and flame retardancy.

When the oil is contained in the propylene resin composition, the propylene resin composition is particularly excellent in flexibility, scratch resistance and low-temperature properties. When the graft modified polymer is contained in the propylene resin composition, the propylene resin composition is particularly excellent in abrasion resistance, whitening resistance and low-temperature properties.

The processes of the invention produce propylene resin compositions that are excellent in flexibility, breaking elongation and flame retardancy as well as in low-temperature properties, scratch resistance, abrasion resistance and stress absorption properties.

The propylene polymer compositions of the invention are suitably used in the production of the propylene resin compositions, and the obtainable propylene resin compositions show particularly excellent scratch resistance and low-temperature properties. The propylene resin compositions of the invention contain the inorganic fillers at high proportions and are therefore suitably used to produce shaped articles of excellent flame retardancy, in particular electric wires.

BEST MODE FOR CARRYING OUT THE INVENTION

Figure 1:
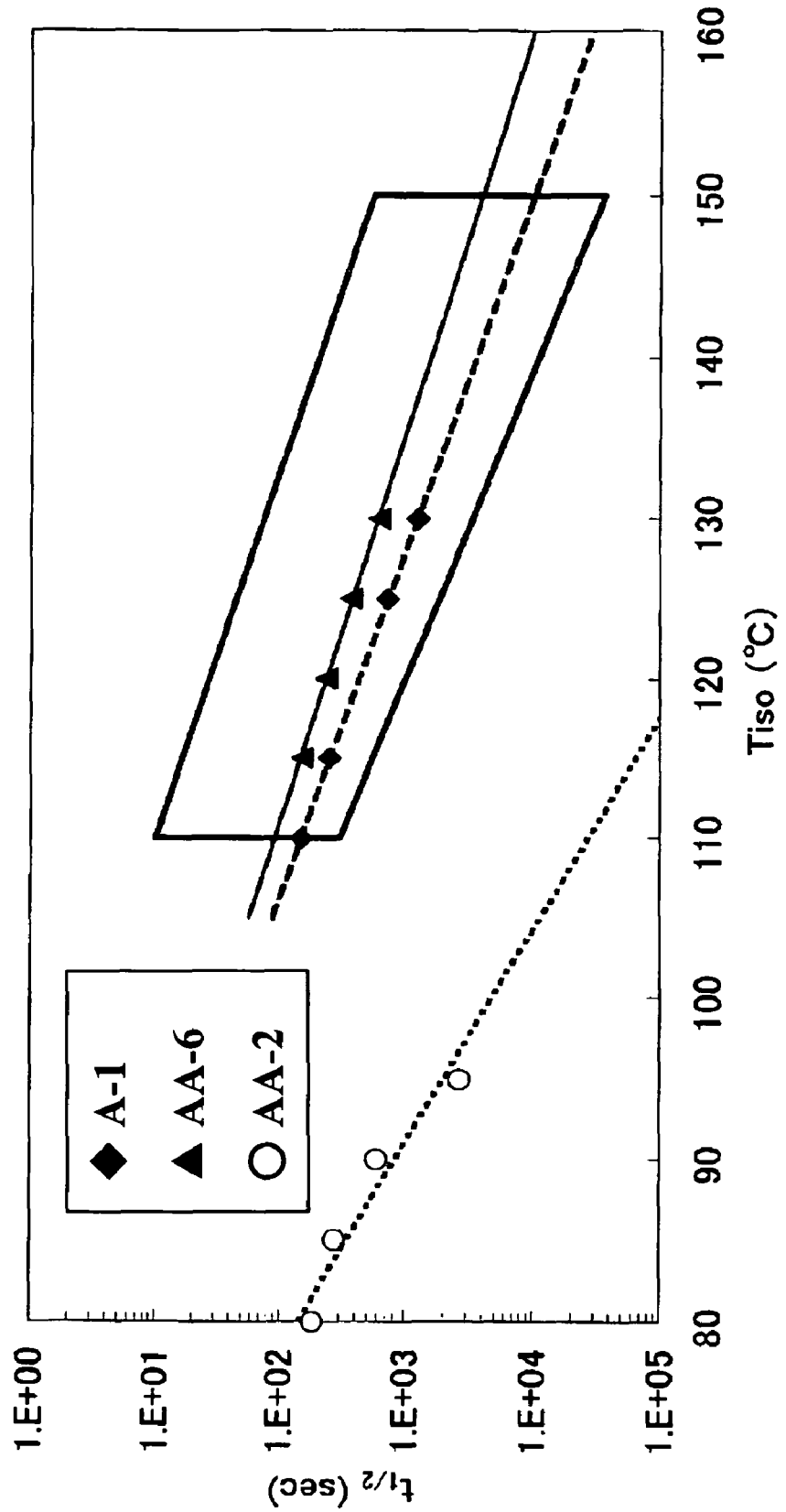
FIG. 1 is a plotted graph showing a relationship between a specific isothermal crystallization temperature ($T_{iso}$) and a half-crystallization time ($t_{1/2}$) at the temperature, for a syndiotactic propylene polymer (A-1) described in Examples of the present invention. The part surrounded by heavy lines indicates a region defined by the inequality expression (Eq-1) which is a preferred property of syndiotactic propylene polymers (A2) according to a preferred embodiment of the present invention. For reference, plots are also indicated with respect to a polymer (AA-6) satisfying the inequality expression (Eq-1) which is a preferred property of the polymers (A2), and with respect to a polymer (AA-2) belonging to the polymers (A2) but not satisfying the inequality expression (Eq-1).

The present invention will be described in detail hereinbelow.

(A) Propylene Polymers

Examples of the propylene polymers (A) include propylene homopolymers and copolymers of propylene and at least one C2-20 α-olefin except propylene. The C2-20 α-olefins except propylene include ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. Of these, ethylene and α-olefins of 4 to 10 carbon atoms are preferable.

The α-olefins and propylene may form random copolymers or block copolymers.

The polypropylene may contain structural units derived from the α-olefins at not more than 35 mol %, and preferably not more than 30 mol %. The propylene polymer (A) has a melt flow rate (MFR) as measured at 230° C. under 2.16 kg load in accordance with ASTM D 1238 in the range of 0.01 to 1000 g/10 min, and preferably 0.05 to 100 g/10 min.

The melting point of the propylene polymer (A) according to differential scanning calorimetry is not less than 100° C., preferably 100 to 170° C., and more preferably 110 to 165° C.

The propylene polymer (A) may be isotactic or syndiotactic depending on the compatibility with the soft propylene copolymer (B) as described later.

An isotactic propylene polymer (A1) that is an embodiment of the propylene polymer (A) will be described in detail below.

The isotactic propylene polymers (A1) that are an embodiment of the propylene polymers (A) include homopolypropylenes excellent in heat resistance (known homopolypropylenes containing not more than 3 mol % of comonomers other than propylene), block polypropylenes excellent in balance between heat resistance and flexibility (known block polypropylenes which contain 3 to 30 wt % of n-decane-soluble rubber components), and random polypropylenes excellent in balance between flexibility and transparency (known random polypropylenes having a fusion peak according to DSC of not less than 100° C., and preferably 110 to 150° C.). These may be selected so that desired properties will be obtained, or two or more kinds having different melting points or rigidity may be used in combination.

The isotactic propylene polymers (A1) may be produced by polymerizing propylene or copolymerizing propylene and the α-olefin in the presence of a Ziegler catalyst system that contains a solid catalyst component containing magnesium, titanium, a halogen and an electron donor as essential components and that further contains an organoaluminum compound and an electron donor, or in the presence of a metallocene catalyst system containing a metallocene compound as a catalyst component.

Next, a syndiotactic propylene polymer (A2) that is an embodiment of the propylene polymer (A) will be described in detail below.

The syndiotactic propylene polymer (A2) contains not less than 90 mol % of structural units derived from propylene and less than 10 mol % of structural units derived from at least one selected from ethylene and C4-20 α-olefins (the total is 100 mol %).

The C4-20 α-olefins include 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene and 1-eicosene. The propylene polymer generally contains not less than 90 mol % of structural units derived from propylene and less than 10 mol % of structural units derived from propylene and C2-20 α-olefins (the total is 100 mol %). Preferably, the propylene polymer contains not less than 91 mol % of structural units derived from propylene and less than 9 mol % of structural units derived from propylene and C2-20 α-olefins (the total is 100 mol %).

The syndiotactic propylene polymer (A2) preferably satisfies both the requirements [1] and [2] below.

[1] The syndiotactic pentad fraction (rrrr fraction) as measured by $^{13}$C-NMR is not less than 85%.

[2] The melting point (Tm) determined by differential scanning calorimetry (hereinafter DSC) is not less than 100° C.

The requirements [1] and [2] will be described below.

Requirement [1]

The syndiotactic pentad fraction (rrrr fraction, pentad syndiotacticity) of the syndiotactic propylene polymer (A2) as measured by $^{13}$C-NMR is not less than 85%, preferably not less than 90%, more preferably not less than 93%, and still more preferably not less than 94%. The polymer (A2) having this rrrr fraction shows excellent formability, heat resistance, transparency and rigidity and has good properties as a crystalline polypropylene. The polymer (A2) having this rrrr fraction may be produced by using a catalyst system as described later under polymerization conditions as described later. The upper limit of the rrrr fraction is not particularly limited, but the fraction is 100% or less, and usually 99% or less.

The syndiotactic pentad fraction (rrrr fraction) is measured as follows.

The rrrr fraction is determined from the absorption intensities of Prrrr (the absorption intensity assigned to the methyl group in the third unit of five syndiotactically arranged continuous propylene units) and Pw (the absorption intensity assigned to all the methyl groups of the propylene units) in the $^{13}$C-NMR spectrum according to the following equation (1):

$$rrrr \text{ fraction} = Prrrr/Pw \tag{1}$$

For example, the NMR measurement is performed as follows. A sample weighing 0.35 g is dissolved in 2.0 ml of hexachlorobutadiene by heating. The solution is filtered through a glass filter (G2), and 0.5 ml of deuterated benzene is added. The mixture is placed into an NMR tube having an internal diameter of 10 mm. $^{13}$C-NMR measurement is then performed at 120° C. using GX-500 NMR apparatus manufactured by JEOL, Ltd., with at least 10,000 scans.

Requirement [2]

The melting point (Tm) of the syndiotactic propylene polymer (A2) as measured by differential scanning calorimetry (DSC) is preferably high. In detail, the melting point in the order of preference is not less than 156° C., not less than 155° C., not less than 150° C., not less than 147° C., not less than 145° C., not less than 115° C., and not less than 100° C. The upper limit of the melting point (Tm) is not particularly limited but may be usually 170° C.

The heat of fusion (ΔH) of the syndiotactic propylene polymer (A2) measured simultaneously with the melting point (Tm) is preferably high. In detail, the heat of fusion in the order of preference is not less than 55 mJ/mg, not less than 52 mJ/mg, not less than 40 mJ/mg, not less than 20 mJ/mg, and not less than 10 mJ/mg. The upper limit of the heat of fusion (ΔH) is not particularly limited but may be usually 120 mJ/mg.

For example, the differential scanning calorimetry is performed in the following manner. Approximately 5 mg of a sample is packed in a special aluminum pan and is tested with DSC Pyris 1 or DSC 7 manufactured by PerkinElmer, Inc. wherein the sample is heated from 30° C. to 200° C. at a rate of 320° C./min, held at 200° C. for 5 minutes, cooled from 200° C. to 30° C. at a rate of 10° C./min, held at 30° C. for 5 minutes, and then heated at a rate of 10° C./min. The melting point is obtained from an endothermic curve recorded during the above test. If a plurality of peaks are detected during DSC, the peak detected at the highest temperature is obtained as the melting point (Tm). The polymer (A2) having this melting point (Tm) shows excellent formability, heat resistance and mechanical properties and has good properties as a crystalline polypropylene. The polymer (A2) having this melting point (Tm) may be produced by using a catalyst system as described later under polymerization conditions as described later.

The syndiotactic propylene polymer (A2) preferably satisfies the requirement [3] in addition to the requirements [1] and [2].

[3] The content of a n-decane-soluble part is not more than 1 wt %.

The requirement [3] will be described below.

Requirement [3]

The syndiotactic propylene polymer (A2) contains a n-decane-soluble part at not more than 1 wt %, preferably not more than 0.8 wt %, and still more preferably not more than 0.6 wt %. The content of a n-decane-soluble part is an index closely related to blocking properties of the syndiotactic propylene polymer or shaped articles obtained therefrom. A low content of a n-decane-soluble part generally means that low-crystalline components are little. That is, the syndiotactic propylene polymer (A2) simultaneously satisfying the requirement [3] has very good antiblocking properties.

Preferably, the syndiotactic propylene polymer (A2) further satisfies the following requirements [a] to [d].

[a] The tensile elastic modulus is in the range of 150 to 2,000 MPa.

[b] The breaking tensile strength is not less than 15 MPa.

[c] A press sheet thereof 1 mm in thickness has an internal haze of not more than 50%.

[d] The needle penetration temperature is not less than 100° C.

The requirements [a] to [d] will be described below.

Requirement [a]

The tensile elastic modulus of the syndiotactic propylene polymer (A2) is in the range of 150 to 2,000 MPa, preferably 300 to 1,800 MPa, and more preferably 500 to 1,500 MPa.

The tensile elastic modulus is a value measured by the following procedures. First, a specimen is provided by punching out a press sheet having a thickness of 1 mm using an O-dumbbell for JIS No. 3 dumbbell according to JIS K 6301. The tensile elastic modulus may be measured using tensile tester Inston 1123 manufactured by Instron, Inc. with a span of 30 mm at a tensile rate of 30 mm/min at 23° C. The measurement is carried out three times, and the results are averaged.

The syndiotactic propylene polymer (A2) having this tensile elastic modulus shows excellent mechanical properties and strength and has good properties as a crystalline polypropylene. The polymer (A2) having this tensile elastic modulus may be produced by using a catalyst system as described later under polymerization conditions as described later.

Requirement [b]

The breaking tensile strength of the syndiotactic propylene polymer (A2) is not less than 15 MPa, preferably not less than 18 MPa, more preferably not less than 20 MPa, and still more preferably not less than 30 MPa.

The breaking tensile strength is a value measured by the following procedures. First, a specimen is provided by punching out a press sheet having a thickness of 1 mm using an O-dumbbell for JIS No. 3 dumbbell according to JIS K 6301. The breaking tensile strength may be measured using tensile tester Inston 1123 manufactured by Instron, Inc. with a span of 30 mm at a tensile rate of 30 mm/min at 23° C. The measurement is carried out three times, and the results are averaged.

The syndiotactic propylene polymer (A2) having this breaking tensile strength has good properties as a crystalline polypropylene. The polymer (A2) having this breaking tensile strength may be produced by using a catalyst system as described later under polymerization conditions as described later.

Requirement [c]

The internal haze of the syndiotactic propylene polymer (A2) is not more than 50%, and preferably not more than 45%.

The internal haze may be determined with respect to a press sheet specimen having a thickness of 1 mm with digital turbidimeter NDH-20D manufactured by Nippon Denshoku Industries Co., Ltd. The measurement is carried out two times, and the results are averaged.

The syndiotactic propylene polymer (A2) having this internal haze shows excellent transparency and has good properties as a crystalline polypropylene. The polymer (A2) having this internal haze may be produced by using a catalyst system as described later under polymerization conditions as described later.

Requirement [d]

The needle penetration temperature of the syndiotactic propylene polymer (A2) is not less than 100° C., and more preferably not less than 115° C. The needle penetration temperature (also referred to as the softening temperature by TMA) may be measured as follows.

A press sheet specimen having a thickness of 1 mm is tested on SS-120 manufactured by Seiko Co., Ltd. or Q-400 manufactured by TA Instruments wherein a plane indenter 1.8 mm in diameter is allowed to press the specimen at 2 kgf/cm² and the temperature is increased at 5° C./min, and the needle penetration temperature (° C.) is determined from a TMA curve.

The syndiotactic propylene polymer (A2) having this needle penetration temperature shows excellent heat resistance and has good properties as a crystalline polypropylene. The polymer (A2) having this needle penetration temperature may be produced by using a catalyst system as described later under polymerization conditions as described later.

The syndiotactic propylene polymer (A2) satisfies the following Equation (Eq-1) in the range of $110 \leq T_{iso} \leq 150$ (° C.) wherein $T_{iso}$ is an isothermal crystallization temperature determined by differential scanning calorimetry (DSC) and $t_{1/2}$ is a half-crystallization time at the isothermal crystallization temperature $T_{iso}$:

[Eq. 1]

$$1.67 \times 10^{-4} \exp(0.10 \times T_{iso}) \leq t_{1/2} \leq 5.56 \times 10^{-4} \exp(0.12 \times T_{iso}) \quad \text{(Eq-1)}$$

preferably satisfies the following equation (Eq-2):

[Eq. 2]

$$1.67 \times 10^{-4} \exp(0.10 \times T_{iso}) \leq t_{1/2} \leq 3.71 \times 10^{-4} \exp(0.12 \times T_{iso}) \quad \text{(Eq-2)}$$

and more preferably satisfies the following equation (Eq-3):

[Eq. 3]

$$1.67 \times 10^{-4} \exp(0.10 \times T_{iso}) \leq t_{1/2} \leq 2.23 \times 10^{-4} \exp(0.12 \times T_{iso}) \quad \text{(Eq-3)}$$

The half-crystallization time ($t_{1/2}$) determined by isothermal crystallization measurement is a time in which 50% is reached of the total heat that is represented by an area between the baseline and the DSC caloric curve recorded during the isothermal crystallization process. (See Shin Koubunshi Jikken Kouza 8, Koubunshi no Bussei (New Lectures on Polymer Experiments 8, Properties of Polymers) (KYORITSU SHUPPAN CO., LTD.).)

The half-crystallization time ($t_{1/2}$) is determined as follows. Approximately 5 mg of a sample is packed in a special aluminum pan and is tested with DSC Pyris 1 or DSC 7 manufactured by PerkinElmer, Inc. wherein the sample is heated from 30° C. to 200° C. at a rate of 320° C./min, held at 200° C. for 5 minutes, cooled from that temperature (200° C.) to the isothermal crystallization temperature at a rate of 320° C./min, and held at the isothermal crystallization temperature. The half-crystallization time ($t_{1/2}$) is obtained from a DSC curve recorded during the above test. The start (t=0) of the measurement of the half-crystallization time ($t_{1/2}$) is when the isothermal crystallization process is initiated (i.e., when the isothermal crystallization temperature is reached from 200° C.). For the syndiotactic propylene polymer (A2), $t_{1/2}$ may be determined as described above. In the event that crystallization does not occur at an isothermal crystallization temperature, for example 110° C., the half-crystallization time ($t_{1/2}$) may be measured at several isothermal crystallization temperatures below 110° C. for the sake of convenience and the results may be extrapolated to give the half-crystallization time ($t_{1/2}$).

The syndiotactic propylene polymer (A2) satisfying the equation (Eq-1) is markedly excellent in formability over existing syndiotactic propylene polymers. The excellent formability used herein means that the polymer in a molten state quickly solidifies in the injection molding, inflation molding, blow molding, extrusion or press molding. Further, such syndiotactic propylene polymer (A2) is excellent in forming cycle properties, shape stability and long-term productivity.

The production of the syndiotactic propylene polymers (A2) may be suitably catalyzed by a polymerization catalyst (cat-1) that includes:

a bridged metallocene compound (K) of Formula [1] below; and at least one compound (L) selected from:

organoaluminum oxy-compounds (L1);

compounds (L2) capable of reacting with the bridged metallocene compound (K) to form an ion pair; and organoaluminum compounds (L3).

It is also suitable to use a polymerization catalyst (cat-2) in which the catalyst (cat-1) is supported on a particulate carrier (P) However, the catalysts are not limited thereto as long as the resultant polymers satisfy the requirements of the propylene polymers (A).

[Chem. 1]

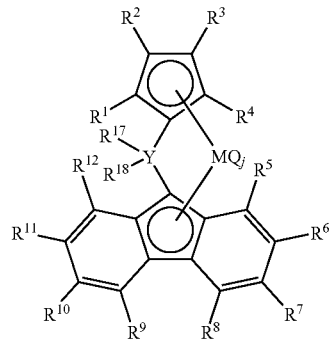

[1]

In Formula [1], $R^1$, $R^2$, $R^3$ and $R^4$ are selected from a hydrogen atom, a hydrocarbon group and a silicon-containing group; $R^2$ and $R^3$ may be linked together to form a ring; $R^5$, $R^6$, $R^8$, $R^9$, $R^{11}$ and $R^{12}$ are selected from a hydrogen atom, a hydrocarbon group and a silicon-containing group; $R^7$ and $R^{10}$ are not hydrogen atoms and are each selected from a hydrocarbon group and a silicon-containing group and may be the same or different from each other; at least one pair of adjacent groups selected from a pair of $R^5$ and $R^6$, a pair of $R^7$ and $R^8$, a pair of $R^8$ and $R^9$, a pair of $R^9$ and $R^{10}$ and a pair of $R^{11}$ and $R^{12}$ may be linked together to form a ring;

$R^{17}$ and $R^{18}$ are each a hydrogen atom, a C1-20 hydrocarbon group or a silicon-containing group and may be the same or different from each other and may be linked together to form a ring;

M is Ti, Zr or Hf; Y is carbon; Q is selected from a halogen atom, a hydrocarbon group, an anionic ligand or a neutral ligand capable of coordination by lone pair electrons and may be the same or different when plural; and j is an integer of 1 to 4.

Specific examples of the compounds (K) meeting the above definitions include cyclopropylidene(cyclopentadienyl)(3,6-di-tert-fluorenyl) zirconium dichloride, cyclobutylidene(cyclopentadienyl)(3,6-di-tert-fluorenyl)zirconium dichloride, cyclopentylidene(cyclopentadienyl)(3,6-di-tert-fluorenyl) zirconium dichloride, cyclohexylidene(cyclopentadienyl)(3,6-di-tert-fluorenyl) zirconium dichloride, cycloheptylidene(cyclopentadienyl)(3,6-di-tert-fluorenyl) zirconium dichloride, dibenzylmethylene(cyclopentadienyl)(3,6-di-tert-butylfluorenyl)zirconium dichloride, dibenzylmethylene(cyclopentadienyl)(octamethyloctahydrodibenzofluorenyl)zirconium dichloride, di-n-butylmethylene(cyclopentadienyl)(2,7-dimethyl-3,6-di-tert-butylfluorenyl)zirconium dichloride, di-n-butylmethylene(cyclopentadienyl(2,7-di(2,4,6-trimethylphenyl)-3,6-di-tert-butylfluorenyl)zirconium dichloride, di-n-butylmethylene(cyclopentadienyl)(2,7-diphenyl-3,6-di-tert-butylfluorenyl)zirconium dichloride, di-n-butylmethylene(cyclopentadienyl)(2,7-di(3,5-dimethylphenyl)-3,6-di-tert-butylfluorenyl)zirconium dichloride, di-n-butylmethylene(cyclopentadienyl)(2,3,6,7-tetra-tert-butylfluorenyl)zirconium dichloride, di-n-butylmethylene(cyclopentadienyl)(2,7-di(4-methylphenyl)-3,6-di-tert-butylfluorenyl)zirconium dichloride, di-n-butylmethylene(cyclopentadienyl)(2,7-dinaphthyl-3,6-di-tert-butylfluorenyl)zirconium dichloride, di-n-butylmethylene(cyclopentadienyl)(2,7-di(4-tert-butylphenyl)-3,6-di-tert-butylfluorenyl)zirconium dichloride, diisobutylmethylene(cyclopentadienyl)(2,7-dimethyl-3,6-di-tert-butylfluorenyl)zirconium dichloride, diisobutylmethylene(cyclopentadienyl(2,7-di(2,4,6-trimethylphenyl)-3,6-di-tert-butylfluorenyl)zirconium dichloride, diisobutylmethylene(cyclopentadienyl)(2,7-diphenyl-3,6-di-tert-butylfluorenyl)zirconium dichloride, diisobutylmethylene(cyclopentadienyl)(2,7-di(3,5-dimethylphenyl)-3,6-di-tert-butylfluorenyl)zirconium dichloride, diisobutylmethylene(cyclopentadienyl)(2,3,6,7-tetra-tert-butylfluorenyl)zirconium dichloride, diisobutylmethylene(cyclopentadienyl)(2,7-di(4-methylphenyl)-3,6-di-tert-butylfluorenyl)zirconium dichloride, diisobutylmethylene(cyclopentadienyl)(2,7-dinaphthyl-3,6-di-tert-butylfluorenyl)zirconium dichloride, diisobutylmethylene(cyclopentadienyl)(2,7-di(4-tert-butylphenyl)-3,6-di-tert-butylfluorenyl)zirconium dichloride, dibenzylmethylene(cyclopentadienyl)(2,7-dimethyl-3,6-di-tert-butylfluorenyl)zirconium dichloride [also referred to as 1,3-diphenylisopropylidene(cyclopentadienyl)(2,7-dimethyl-3,6-di-tert-butylfluorenyl)zirconium dichloride, alias names are omitted for the following compounds], dibenzylmethylene(cyclopentadienyl(2,7-di(2,4,6-trimethylphenyl)-3,6-di-tert-butylfluorenyl)zirconium dichloride, dibenzylmethylene(cyclopentadienyl)(2,7-diphenyl-3,6-di-tert-butylfluorenyl)zirconium dichloride, dibenzylmethylene(cyclopentadienyl)(2,7-di(3,5-dimethylphenyl)-3,6-di-tert-butylfluorenyl)zirconium dichloride, dibenzylmethylene(cyclopentadienyl)(2,3,6,7-tetra-tert-butylfluorenyl)zirconium dichloride, dibenzylmethylene(cyclopentadienyl)(2,7-di(4-methylphenyl)-3,6-di-tert-butylfluorenyl)zirconium dichloride, dibenzylmethylene(cyclopentadienyl)(2,7-dinaphthyl-3,6-di-tert-butylfluorenyl)zirconium dichloride, dibenzylmethylene(cyclopentadienyl)(2,7-di(4-tert-butylphenyl)-3,6-di-tert-butylfluorenyl)zirconium dichloride, diphenetylmethylene(cyclopentadienyl)(2,7-dimethyl-3,6-di-tert-butylfluorenyl)zirconium dichloride, diphenetylmethylene(cyclopentadienyl)(2,7-diphenyl-3,6-di-tert-butylfluorenyl)zirconium dichloride,
di(benzhydryl)methylene(cyclopentadienyl)(2,7-dimethyl-3,6-di-tert-butylfluorenyl)zirconium dichloride,
di(benzhydryl)methylene(cyclopentadienyl)(2,7-diphenyl-3,6-di-tert-butylfluorenyl)zirconium dichloride,
di(cumyl)methylene(cyclopentadienyl)(2,7-dimethyl-3,6-di-tert-butylfluorenyl)zirconium dichloride,
di(cumyl)methylene(cyclopentadienyl)(2,7-diphenyl-3,6-di-tert-butylfluorenyl)zirconium dichloride,
di(1-phenyl-ethyl)methylene(cyclopentadienyl)(2,7-dimethyl-3,6-di-tert-butylfluorenyl)zirconium dichloride,
di(1-phenyl-ethyl)methylene(cyclopentadienyl)(2,7-diphenyl-3,6-di-tert-butylfluorenyl)zirconium dichloride,
di(cyclohexylmethyl)methylene(cyclopentadienyl)(2,7-dimethyl-3,6-di-tert-butylfluorenyl)zirconium dichloride,
di(cyclohexylmethyl)methylene(cyclopentadienyl)(2,7-diphenyl-3,6-di-tert-butylfluorenyl)zirconium dichloride,
di(cyclopentylmethyl)methylene(cyclopentadienyl)(2,7-dimethyl-3,6-di-tert-butylfluorenyl)zirconium dichloride,
di(cyclopentylmethyl)methylene(cyclopentadienyl)(2,7-diphenyl-3,6-di-tert-butylfluorenyl)zirconium dichloride,
di(naphthylmethyl)methylene(cyclopentadienyl)(2,7-dimethyl-3,6-di-tert-butylfluorenyl)zirconium dichloride,
di(naphthylmethyl)methylene(cyclopentadienyl)(2,7-diphenyl-3,6-di-tert-butylfluorenyl)zirconium dichloride,
di(biphenylmethyl)methylene(cyclopentadienyl)(2,7-dimethyl-3,6-di-tert-butylfluorenyl)zirconium dichloride,
di(biphenylmethyl)methylene(cyclopentadienyl)(2,7-diphenyl-3,6-di-tert-butylfluorenyl)zirconium dichloride,
(benzyl)(n-butyl)methylene(cyclopentadienyl)(2,7-dimethyl-3,6-di-tert-butylfluorenyl)zirconium dichloride,
(benzyl)(n-butyl)methylene(cyclopentadienyl)(2,7-diphenyl-3,6-di-tert-butylfluorenyl)zirconium dichloride,
(benzyl)(cumyl)methylene(cyclopentadienyl)(2,7-dimethyl-3,6-di-tert-butylfluorenyl)zirconium dichloride,
(benzyl)(cumyl)methylene(cyclopentadienyl)(2,7-diphenyl-3,6-di-tert-butylfluorenyl)zirconium dichloride,
cyclopropylidene(cyclopentadienyl)(2,7-dimethyl-3,6-di-tert-butylfluorenyl)zirconium dichloride,
cyclopropylidene(cyclopentadienyl)(2,7-diphenyl-3,6-di-tert-butylfluorenyl)zirconium dichloride,
cyclobutylidene(cyclopentadienyl)(2,7-dimethyl-3,6-di-tert-butylfluorenyl)zirconium dichloride,
cyclobutylidene(cyclopentadienyl)(2,7-diphenyl-3,6-di-tert-butylfluorenyl)zirconium dichloride,
cyclopentylidene(cyclopentadienyl)(2,7-dimethyl-3,6-di-tert-butylfluorenyl)zirconium dichloride,
cyclopentylidene(cyclopentadienyl)(2,7-diphenyl-3,6-di-tert-butylfluorenyl)zirconium dichloride,
cyclohexylidene(cyclopentadienyl)(2,7-dimethyl-3,6-di-tert-butylfluorenyl)zirconium dichloride,
cyclohexylidene(cyclopentadienyl)(2,7-diphenyl-3,6-di-tert-butylfluorenyl)zirconium dichloride,
cycloheptylidene(cyclopentadienyl)(2,7-dimethyl-3,6-di-tert-butylfluorenyl)zirconium dichloride,
cycloheptylidene(cyclopentadienyl)(2,7-diphenyl-3,6-di-tert-butylfluorenyl)zirconium dichloride,
dibenzylmethylene(cyclopentadienyl)(2,7-dimethyl-3,6-dimethyl-butylfluorenyl)zirconium dichloride,
di-n-butylmethylene(cyclopentadienyl)(2,7-dimethyl-3,6-dimethyl-butylfluorenyl)zirconium dichloride,
dibenzylmethylene(cyclopentadienyl)(2,7-dimethyl-3,6-dicumyl-butylfluorenyl)zirconium dichloride,
di-n-butylmethylene(cyclopentadienyl)(2,7-dimethyl-3,6-dicumyl-butylfluorenyl)zirconium dichloride,
dibenzylmethylene(cyclopentadienyl)(2,7-dimethyl-3,6-di(trimethylsilyl)-butylfluorenyl)zirconium dichloride,
di-n-butylmethylene(cyclopentadienyl)(2,7-dimethyl-3,6-di(trimethylsilyl)-butylfluorenyl)zirconium dichloride,
dibenzylmethylene(cyclopentadienyl)(2,7-dimethyl-3,6-diphenyl-butylfluorenyl)zirconium dichloride,
di-n-butylmethylene(cyclopentadienyl)(2,7-dimethyl-3,6-diphenyl-butylfluorenyl)zirconium dichloride,
dibenzylmethylene(cyclopentadienyl)(2,7-dimethyl-3,6-dibenzyl-butylfluorenyl)zirconium dichloride,
di-n-butylmethylene(cyclopentadienyl)(2,7-dimethyl-3,6-dibenzyl-butylfluorenyl)zirconium dichloride,
dibenzylmethylene(cyclopentadienyl)(2,7-dimethyl-3,6-dimethyl-butylfluorenyl)zirconium dichloride,
di-n-butylmethylene(cyclopentadienyl)(2,7-dimethyl-3,6-dimethyl-butylfluorenyl)zirconium dichloride,
diphenylmethylene(cyclopentadienyl)(2,7-dimethyl-3,6-di-tert-butylfluorenyl)zirconium dichloride,
diphenylmethylene(cyclopentadienyl)(2,7-diphenyl-3,6-di-tert-butylfluorenyl)zirconium dichloride,
di(p-tolyl)methylene(cyclopentadienyl)(2,7-dimethyl-3,6-di-tert-butylfluorenyl)zirconium dichloride,
di(p-tolyl)methylene(cyclopentadienyl)(2,7-diphenyl-3,6-di-tert-butylfluorenyl)zirconium dichloride,
di(p-chlorophenyl)methylene(cyclopentadienyl)(2,7-dimethyl-3,6-di-tert-butylfluorenyl)zirconium dichloride,
di(p-chlorophenyl)methylene(cyclopentadienyl)(2,7-diphenyl-3,6-di-tert-butylfluorenyl)zirconium dichloride,
di(m-chlorophenyl)methylene(cyclopentadienyl)(2,7-dimethyl-3,6-di-tert-butylfluorenyl)zirconium dichloride,
di(m-chlorophenyl)methylene(cyclopentadienyl)(2,7-diphenyl-3,6-di-tert-butylfluorenyl)zirconium dichloride,
di(p-bromophenyl)methylene(cyclopentadienyl)(2,7-dimethyl-3,6-di-tert-butylfluorenyl)zirconium dichloride,
di(p-bromophenyl)methylene(cyclopentadienyl)(2,7-diphenyl-3,6-di-tert-butylfluorenyl)zirconium dichloride,
di(m-trifluoromethyl-phenyl)methylene(cyclopentadienyl)(2,7-dimethyl-3,6-di-tert-butylfluorenyl)zirconium dichloride,
di(m-trifluoromethyl-phenyl)methylene(cyclopentadienyl)(2,7-diphenyl-3,6-di-tert-butylfluorenyl)zirconium dichloride,
di(p-trifluoromethyl-phenyl)methylene(cyclopentadienyl)(2,7-dimethyl-3,6-di-tert-butylfluorenyl)zirconium dichloride,
di(p-trifluoromethyl-phenyl)methylene(cyclopentadienyl)(2,7-diphenyl-3,6-di-tert-butylfluorenyl)zirconium dichloride,
di(p-tert-butyl-phenyl)methylene(cyclopentadienyl)(2,7-dimethyl-3,6-di-tert-butylfluorenyl)zirconium dichloride,
di(p-tert-butyl-phenyl)methylene(cyclopentadienyl)(2,7-diphenyl-3,6-di-tert-butylfluorenyl)zirconium dichloride,
di(p-n-butyl-phenyl)methylene(cyclopentadienyl)(2,7-dimethyl-3,6-di-tert-butylfluorenyl)zirconium dichloride,
di(p-n-butyl-phenyl)methylene(cyclopentadienyl)(2,7-diphenyl-3,6-di-tert-butylfluorenyl)zirconium dichloride,
di(p-biphenyl)methylene(cyclopentadienyl)(2,7-dimethyl-3,6-di-tert-butylfluorenyl)zirconium dichloride,
di(p-biphenyl)methylene(cyclopentadienyl)(2,77-diphenyl-3,6-di-tert-butylfluorenyl)zirconium dichloride,
di(1-naphthyl)methylene(cyclopentadienyl)(2,7-dimethyl-3,6-di-tert-butylfluorenyl)zirconium dichloride,
di(1-naphthyl)methylene(cyclopentadienyl)(2,7-diphenyl-3,6-di-tert-butylfluorenyl)zirconium dichloride,
di(2-naphthyl)methylene(cyclopentadienyl)(2,7-dimethyl-3,6-di-tert-butylfluorenyl)zirconium dichloride,
di(2-naphthyl)methylene(cyclopentadienyl)(2,7-diphenyl-3,6-di-tert-butylfluorenyl)zirconium dichloride,
di(naphthylmethyl)methylene(cyclopentadienyl)(2,7-dimethyl-3,6-di-tert-butylfluorenyl)zirconium dichloride,
di(naphthylmethyl)methylene(cyclopentadienyl)(2,7-diphenyl-3,6-di-tert-butylfluorenyl)zirconium dichloride,
di(p-isopropylphenyl)methylene(cyclopentadienyl)(2,7-dimethyl-3,6-di-tert-butylfluorenyl)zirconium dichloride, di(p-isopropylphenyl)methylene(cyclopentadienyl)(2,7-diphenyl-3,6-di-tert-butylfluorenyl)zirconium dichloride,
di(biphenylmethyl)methylene(cyclopentadienyl)(2,7-dimethyl-3,6-di-tert-butylfluorenyl)zirconium dichloride,
di(biphenylmethyl)methylene(cyclopentadienyl)(2,7-diphenyl-3,6-di-tert-butylfluorenyl)zirconium dichloride,
diphenylsilylene(cyclopentadienyl)(2,7-dimethyl-3,6-di-tert-butylfluorenyl)zirconium dichloride and
diphenylsilylene(cyclopentadienyl)(2,7-diphenyl-3,6-di-tert-butylfluorenyl)zirconium dichloride.

Of the above compounds, those corresponding to Formula [1] wherein $R^6$ and $R^{11}$ are aryl groups or substituted aryl groups such as phenyl group, tolyl group, t-butylphenyl group, dimethylphenyl group, trimethylphenyl group or biphenyl group are preferable because the obtainable catalyst gives syndiotactic propylene polymers (A2) having a high melting point.

There may be used bridged metallocene compounds corresponding to the above compounds except that zirconium is replaced by hafnium or titanium, except that dichloride is replaced by difluoride, dibromide or diiodide, or except that dichloride is replaced by dimethyl or methylethyl.

The bridged metallocene compounds (K) may be produced by known methods without limitation. Such methods may be found in WO 2001/27124 and WO 2004/087775 filed by the present applicant. The metallocene compounds may be used singly, or two or more kinds may be used in combination.

In the polymerization catalyst, at least one compound (L) is selected from organoaluminum oxy-compounds (L1), compounds (L2) capable of reacting with the bridged metallocene compound (K) to form an ion pair, and organoaluminum compounds (L3). The catalyst for the production of the polymer (A2) may further include a particulate carrier (P) as required. These components will be described in detail below.

Organoaluminum Oxy-Compounds (L1)

The organoaluminum oxy-compounds (L1) may be known aluminoxanes. Specific examples thereof include compounds represented by Formula [2]:

[Chem. 2]

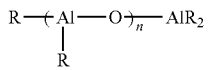

[2]

wherein R at each occurrence is independently a C1-10 hydrocarbon group, and n represents an integer of 2 or greater;

and/or by Formula [3]:

[Chem. 3]

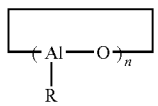

[3]

wherein R represents a C1-10 hydrocarbon group, and n represents an integer of 2 or greater. In particular, methylaluminoxane in which R is a methyl group and n is 3 or greater, preferably 10 or greater, may be used. These aluminoxanes may contain some amounts of organoaluminum compounds.

Examples of the organoaluminum oxy-compounds (L1) further include modified methylaluminoxanes represented by Formula [4]:

[Chem. 4]

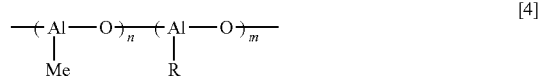

[4]

wherein R is a C1-10 hydrocarbon group, and m and n are each independently an integer of 2 or greater.

The modified methylaluminoxanes may be prepared using trimethylaluminum and an alkylaluminum other than trimethylaluminum. The compounds [4] are generally referred to as MMAO. MMAO may be prepared by a method disclosed in U.S. Pat. No. 4,960,878 or may be commercially available.

Compounds (L2) Capable of Reacting with Bridged Metallocene Compound (K) to Form Ion Pair Examples of the compounds (L2) capable of reacting with the bridged metallocene compound (K) to form an ion pair (hereinafter, referred to as the ionic compounds) include Lewis acids, ionic compounds, borane compounds and carborane compounds described in JP-A-H01-501950 and U.S. Pat. No. 5,321,106. Heteropoly compounds and isopoly compounds are also usable.

Organoaluminum Compounds (L3)

Examples of the organoaluminum compounds (L3) for the olefin polymerization catalyst include organoaluminum compounds represented by Formula [5] below:

$$R^a{}_m Al(OR^b)_n H_p X_q$$ [5]

wherein $R^a$ and $R^b$ may be identical to or different from each other and represent a hydrocarbon group of 1 to 15, preferably 1 to 4 carbon atoms, X represents a halogen atom, $0<m\leq3$, $0\leq n<3$, $0\leq p<3$, $0\leq q<3$, and $m+n+p+q=3$.

Specific examples of such compounds include tri-n-alkylaluminums such as trimethylaluminum, triethylaluminum, tri-n-butylaluminum, trihexylaluminum and trioctylaluminum;

tri-branched-alkylaluminums such as triisopropylaluminum, triisobutylaluminum, tri-sec-butylaluminum, tri-tert-butylaluminum, tri-2-methylbutylaluminum, tri-3-methylhexylaluminum and tri-2-ethylhexylaluminum;

tricycloalkylaluminums such as tricyclohexylaluminum and tricyclooctylaluminum;

triarylaluminums such as triphenylaluminum and tritolylaluminum;

dialkylaluminum hydrides such as diisopropylaluminum hydride and diisobutylaluminum hydride;

alkenylaluminums represented by the general formula: $(i\text{-}C_4H_9)_x Al_y (C_5H_{10})_z$ (wherein x, y and z are positive numbers, and $z\leq 2x$) such as isoprenylaluminum;

alkylaluminum alkoxides such as isobutylaluminum methoxide and isobutylaluminum ethoxide;

dialkylaluminum alkoxides such as dimethylaluminum methoxide, diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminums having an average composition represented by $R^a{}_{2.5}Al(OR^b)_{0.5}$;

alkylaluminum aryloxides such as diethylaluminum phenoxide and diethylaluminum (2,6-di-t-butyl-4-methylphenoxide);

dialkylaluminum halides such as dimethylaluminum chloride, diethylaluminum chloride, dibutylaluminum chloride, diethylaluminum bromide and diisobutylaluminum chloride;

alkylaluminum sesquihalides such as ethylaluminum sesquichloride, butylaluminum sesquichloride and ethylaluminum sesquibromide;

partially halogenated alkylaluminums such as alkylaluminum dihalides including ethylaluminum dichloride;

dialkylaluminum hydrides such as diethylaluminum hydride and dibutylaluminum hydride;

partially hydrogenated alkylaluminums such as alkylaluminum dihydrides including ethylaluminum dihydride and propylaluminum dihydride; and partially alkoxylated and halogenated alkylaluminums such as ethylaluminum ethoxychloride, butylaluminum butoxychloride and ethylaluminum ethoxybromide.

Of the organoaluminum compounds (L3), trimethylaluminum and triisobutylaluminum are preferably used because of easy availability.

The catalyst for the production of the polymer (A2) may further contain a particulate carrier (P) together with the bridged metallocene compound (K) represented by Formula [1] and at least one compound (L) selected from the organoaluminum oxy-compounds (L1), the compounds (L2) capable of reacting with the bridged metallocene compound (K) to form an ion pair, and the organoaluminum compounds (L3).

Particulate Carriers (P)

The particulate carrier (P) is an inorganic or organic compound and is a granular or fine particulate solid. Preferred examples of the inorganic compounds include porous oxides, inorganic chlorides, clays, clay minerals and ion-exchange layered compounds.

Examples of the porous oxides include $SiO_2$, $Al_2O_3$, MgO, ZrO, $TiO_2$, $B_2O_3$, CaO, ZnO, BaO, $ThO_2$, and complexes or mixtures containing these oxides such as natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, those based on $SiO_2$ and/or $Al_2O_3$ are preferable.

The inorganic oxides may contain small amounts of carbonates, sulfates, nitrates or oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Examples of the inorganic halides include $MgCl_2$, $MgBr_2$, $MnCl_2$ and $MnBr_2$. The inorganic halides may be used directly or after ground with a ball mill or a vibration mill. The inorganic halides may be used after they are dissolved in a solvent such as alcohol and precipitated into fine particles using a precipitating agent.

The clays are usually composed of clay minerals as main components. The ion-exchange layered compounds have a crystal structure in which planes formed by ionic bond or the like are arranged on one another in parallel with weak bonding strength and in which the ions are exchangeable. Most clay minerals are ion-exchange layered compounds. The clays, clay minerals and ion-exchange layered compounds are not limited to natural products, and artificial products may also be used. Examples of the clays, clay minerals and ion-exchange layered compounds include clays, clay minerals and ion crystalline compounds having a layered crystal structure such as hexagonal close packing structure, antimony structure, $CdCl_2$ structure or $CdI_2$ structure.

The ion-exchange layered compounds may be enlarged in interlayer distance by exchanging the interlayer exchangeable ions with other larger and bulkier ions using ion exchangeability. The clays and clay minerals are preferable, and montmorillonite, vermiculite, hectorite, teniolite and synthetic mica are particularly preferable.

Examples of the organic compounds include granular or fine particulate solids having a particle diameter in the range of 3 to 300 μm, and preferably 10 to 300 μm. Specific examples thereof include (co)polymers produced from a C2-14 α-olefin such as ethylene, propylene, 1-butene or 4-methyl-1-pentene as a main component; (co)polymers produced from vinylcyclohexane or styrene as a main component; and modified products of these polymers.

The polymerization catalyst may contain an organic compound component (E) as required, with examples including alcohols, phenolic compounds, carboxylic acids, phosphorus compounds and sulfonates.

In the polymerization, the compounds may be used and added in any manner or order without limitation. For example, the polymerization may be performed as follows.

(1) The compound (K) alone is added to a polymerization reactor.

(2) The compound (K) and the compound (L) are added to a polymerization reactor in any order.

(3) A catalyst component in which the compound (K) is supported on the particulate carrier (P), and the compound (L) are added to a polymerization reactor in any order.

(4) A catalyst component in which the compound (L) is supported on the particulate carrier (P), and the compound (K) are added to a polymerization reactor in any order.

(5) A catalyst in which the compounds (K) and (L) are supported on the particulate carrier (P) is added to a polymerization reactor.

In the methods (2) to (5), two or more of the catalyst components may be brought into contact with each other beforehand.

In the methods (4) and (5) in which the compound (L) is supported, an unsupported compound (L) may be added in any order as required. In this case, the compounds (L) may be identical to or different from each other.

Further, the solid catalyst component in which the compound (K) or the compounds (K) and (L) are supported on the particulate carrier (P) may be prepolymerized with an olefin. Furthermore, a catalyst component may be supported on the prepolymerized solid catalyst component.

In the present invention, polymerization may be carried out by a liquid phase polymerization method such as solution polymerization or suspension polymerization, or by a gas phase polymerization method. The liquid phase polymerization may involve inert hydrocarbon solvents including aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures of these hydrocarbons. The olefin to be polymerized may be used as a solvent.

In the olefin polymerization with the olefin polymerization catalyst as described above, the compound (K) is usually used in an amount of $10^{-9}$ to $10^{-1}$ mol, and preferably $10^{-8}$ to $10^{-2}$ mol per liter of the reaction volume.

The compound (L1) is used in an amount such that the molar ratio of the compound (L1) and all the transition metal atoms (M) in the compound (K) [(L1)/M] is usually 0.01 to 5,000, and preferably 0.05 to 2,000. The compound (L2) is used in an amount such that the molar ratio of the compound (L2) and all the transition metal atoms (M) in the compound (K) [(L2)/M] is usually 1 to 10, and preferably 1 to 5. The compound (L3) is used in an amount such that the molar ratio of the aluminum atoms in the compound (L3) and all the transition metal atoms (M) in the compound (K) [(L3)/M] is usually 10 to 5,000, and preferably 20 to 2,000.

The component (E) is used, in the case where the compound (L) is the compound (L1), in an amount such that the molar ratio [(E)/(L1)] is usually 0.01 to 10, and preferably 0.1 to 5; in the case where the compound (L) is the compound (L2), in an amount such that the molar ratio [(E)/(L2)] is usually 0.01 to 10, and preferably 0.1 to 5; and in the case where the compound (L) is the compound (L3), in an amount such that the molar ratio [(E)/(L3)] is usually 0.01 to 2, and preferably 0.005 to 1.

The temperature in the olefin polymerization using the olefin polymerization catalyst is generally within the range of from −50 to +200° C., and preferably from 0 to 170° C. The polymerization pressure is generally from normal pressure to 10 MPa gauge pressure, and preferably from normal pressure to 5 MPa gauge pressure. The polymerization reaction may be carried out batchwise, semi-continuously or continuously. The polymerization may be carried out in two or more stages under different reaction conditions. The molecular weight of the obtainable olefin polymer may be controlled by using hydrogen in the polymerization system or by adjusting the polymerization temperature. Moreover, the molecular weight may be regulated by adjusting the amount of the compound (L) used. When hydrogen is added, a suitable amount thereof is about 0.001 to 100 NL per kg of the olefin.

(B) Soft Propylene Copolymers

The soft propylene copolymer (B) used in the invention satisfies the requirement (b) below.

(b) The MFR measured at 230° C. under a load of 2.16 kg in accordance with ASTM D 1238 is in the range of 0.01 to 100 g/10 min, and at least one of the following requirements (b-1) and (b-2) is satisfied:

(b-1) the syndiotactic triad fraction (rr fraction) as measured by $^{13}$C-NMR is not less than 60%; and (b-2) the copolymer contains 55 to 90 mol % of structural units derived from propylene (with the proviso that the total of the structural units derived from propylene and structural units derived from C2-20 α-olefin(s) (excluding propylene) is 100 mol %) and 10 to 45 mol % of structural units derived from at least one olefin selected from C2-20 α-olefins (excluding propylene), and an intrinsic viscosity [η] (dL/g) as measured in decalin at 135° C. and the MFR (g/10 min, 230° C., 2.16 kg load) satisfy the following relationship:

$$1.50 \times MFR^{(-0.20)} \leq [\eta] \leq 2.65 \times MFR^{(-0.20)}$$

The requirement (b) will be explained below.

Requirement (b):

The soft propylene copolymer (B) has a melt flow rate (MFR, ASTM D 1238, 230° C., 2.16 kg load) of 0.01 to 50 g/10 min, and preferably 0.01 to 30 dl/g.

The soft propylene copolymer (B) satisfies at least one of the requirements (b-1) and (b-2).

Requirement (b-1):

The requirement (b-1) will be described.

The syndiotactic triad fraction (rr fraction, triad syndiotacticity) of the soft propylene copolymer (B) as measured by $^{13}$C-NMR is not less than 60%, preferably not less than 70%, and more preferably not less than 75%. This rr fraction ensures that the obtainable resin composition shows good stress absorbing performance.

The rr fraction is determined from the absorption intensities of Prr (the absorption intensity assigned to the methyl group of the second unit in three syndiotactically arranged continuous propylene units) and Pw (the absorption intensity assigned to all the methyl groups of the propylene units) in a $^{13}$C-NMR spectrum by the following equation (2).

$$rr \text{ fraction} = Prr/Pw \quad (2)$$

In the calculation of the fraction, absorptions assigned to other comonomers can overlap the mr absorption (the absorption assigned to at least both the syndiotactic bonding and isotactic bonding in three propylene units; used in the determination of Pmr (absorption intensity)), or the rr absorption (the absorption assigned to the methyl group of the second unit in three syndiotactically arranged continuous propylene units; used in the determination of Prr (absorption intensity)), or the mm absorption (the absorption assigned to the methyl group of the second unit in three isotactically arranged continuous propylene units; used in the determination of Pmm (absorption intensity)). In such event, the calculation is made without considering the contribution of such comonomer components.

Here, JP-A-2002-097325 may be referred to in which paragraphs [0018] to [0031] describe how to determine the "syndiotacticity parameter (SP value)". In detail, the procedures described from [0018] to [0023] may be performed and the fraction may be determined from the above equation (2) based on the integrated intensities of the signals in the first region, the second region and the third region.

In the present invention, the $rr_1$ fraction, specifically the fraction determined by the method of determining the "syndiotacticity parameter (SP value)" described in [0018] to of JP-A-2002-097325, is preferably not less than 60%, more preferably not less than 65%, and still more preferably not less than 70%. The $rr_1$ fraction in other words corresponds to the rr fraction except that the calculation of the $rr_1$ fraction deducts the contribution of comonomer components when absorptions assigned to other comonomers overlap the mr absorption (the absorption assigned to at least both the syndiotactic bonding and isotactic bonding in three propylene units; used in the determination of Pmr (absorption intensity)), or the rr absorption (the absorption assigned to the methyl group of the second unit in three syndiotactically arranged continuous propylene units; used in the determination of Prr (absorption intensity)), or the mm absorption (the absorption assigned to the methyl group of the second unit in three isotactically arranged continuous propylene units; used in the determination of Pmm (absorption intensity)).

In the determination of the rr fraction and the $rr_1$ fraction, NMR may be carried out in the following manner. A sample weighing 0.35 g is dissolved in 2.0 ml of hexachlorobutadiene by heating. The solution is filtered through a glass filter (G2), 0.5 ml of deuterated benzene is added, and the mixture is placed in an NMR tube having an inner diameter of 10 mm. Then, $^{13}$C-NMR measurement is performed at 120° C. using GX-400 NMR apparatus manufactured by JEOL, Ltd., with at least 8,000 scans.

Requirement (b-2):

Next, the requirement (b-2) will be explained.

The soft propylene copolymer (B) contains 55 to 90 mol % of structural units derived from propylene and 10 to 45 mol % of structural units derived from a C2-20 α-olefin (excluding propylene). Here, the total of the structural units derived from propylene and the structural units derived from a C2-20 α-olefin (excluding propylene) is 100 mol %.

Examples of the C2-20 α-olefins (excluding propylene) include ethylene, 3-methyl-1-butene, 1-butene, 1-pentene, 1-hexene, 4-methyl-1-pentene, 1-octene, 1-decene, 1-dodecene, 1-tetradecene, 1-hexadecene, 1-octadecene and 1-eicosene. In particular, ethylene, 1-butene, 1-hexene, 4-methyl-1-pentene and 1-octene are preferred.

In the soft propylene copolymer (B), an intrinsic viscosity [η](dL/g) as measured in decalin at 135° C. and the MFR (g/10 min) determined at 230° C. under 2.16 kg load in accordance with ASTM D 1238 satisfy the following relationship:

$$1.50 \times MFR^{(-0.20)} \leq [\eta] \leq 2.65 \times MFR^{(-0.20)},$$

and more preferably $$1.80 \times MFR^{(-0.20)} \leq [\eta] \leq 2.50 \times MFR^{(-0.19)}.$$

Other Requirements:

The soft propylene copolymer (B) preferably has a melting point of less than 100° C. or does not show a melting point in differential scanning calorimetry (DSC). Here, that the copolymer does not show a melting point means that no peaks indicating a heat of crystal fusion of 1 J/g or more are observed in the range of −150 to 200° C. Conditions of the measurement of melting point are described in Examples later.

The intrinsic viscosity [η] of the soft propylene copolymer (B) as measured in decalin at 135° C. is preferably 0.1 to 10 dL/g, and more preferably 0.5 to 10 dL/g.

The soft propylene copolymer (B) preferably has a crystallinity of not more than 20%, and more preferably from 0 to 15% as measured by X-ray diffractometry.

The soft propylene copolymer (B) has a single glass transition temperature, and the glass transition temperature (Tg) according to differential scanning calorimetry (DSC) is usually in the range of −50 to 10° C., preferably −40 to 0° C., and more preferably −35 to 0° C. This glass transition temperature (Tg) of the soft propylene copolymer (B) ensures excellent cold resistance and low-temperature properties and good stress absorbing performance.

The differential scanning calorimetry may be performed in the following manner. Approximately 10.00 mg of a sample is placed in a special aluminum pan and is heated from 30° C. to 200° C. at a rate of 200° C./min, held at 200° C. for 5 minutes, cooled from 200° C. to −100° C. at a rate of 10° C./min, held at −100° C. for 5 minutes and heated at a rate of 10° C./min; the glass transition temperature (Tg) is determined from an endothermic curve recorded during the above process with DSC RDC 220 manufactured by Seiko Instruments, Inc.

The soft propylene copolymer (B) preferably has GPC molecular weight distribution (Mw/Mn, relative to polystyrene standards, Mw: weight average molecular weight, Mn: number average molecular weight) of not more than 3.5, more preferably not more than 3.0, and still more preferably not more than 2.5. The lower limit is for example 1.5.

The soft propylene copolymer (B) may be partially graft modified with a polar monomer. Examples of the polar monomers include hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and derivatives thereof, vinyl ester compounds and vinyl chloride. Such modified soft propylene copolymer (B) may be obtained by graft polymerizing the polar monomer to the soft propylene copolymer (B). When the polar monomer is graft polymerized to the soft propylene copolymer (B), the polar monomer is usually used in an amount of 1 to 100 parts by weight, and preferably 5 to 80 parts by weight based on 100 parts by weight of the soft propylene copolymer (B). The graft polymerization is generally performed in the presence of a radical initiator. Organic peroxides, azo compounds and the like may be used as the radical initiators. The radical initiator may be directly mixed with the soft propylene copolymer (B) and the polar monomer, or may be used after dissolved in a small amount of an organic solvent. The organic solvent used herein is not particularly limited as long as the radical initiator is dissolved therein. The graft polymerization of the polar monomer to the soft propylene copolymer (B) may involve reducing substances. The use of reducing substances leads to an increased amount of the polar monomer that is grafted.

The graft modification of the soft propylene copolymer (B) with the polar monomer may be performed by a conventionally known method. For example, the soft propylene copolymer (B) may be dissolved in an organic solvent, subsequently the polar monomer, the radical initiator and additives may be added to the solution, and the mixture is reacted at a temperature of 70 to 200° C., preferably 80 to 190° C., for 0.5 to 15 hours, preferably 1 to 10 hours. Alternatively, the soft propylene copolymer (B) and the polar monomer may be reacted without a solvent in an extruder or the like to give a modified soft propylene copolymer (B). This reaction is preferably performed at or above the melting point of the soft propylene copolymer (B), specifically at a temperature of 120 to 250° C. for 0.5 to 10 minutes.

The modification percentage in the modified soft propylene copolymer (the amount of the polar monomer that is grafted to the copolymer) is preferably 0.1 to 50 wt %, more preferably 0.2 to 30 wt %, and still more preferably 0.2 to 10 wt %.

When the propylene polymer composition of the invention contains the modified soft propylene copolymer, the composition may achieve improvements in adhesion and compatibility with other resins and wettability of the surface of obtainable shaped articles therefrom.

The soft propylene copolymers (B) may be produced by polymerizing propylene and at least one olefin selected from C2-20 α-olefins (excluding propylene) in the presence of an olefin polymerization catalyst comprising:

a bridged metallocene compound (I') represented by Formula [6] below; and at least one compound (II) selected from:

organoaluminum oxy-compounds (II-1), compounds capable of reacting with the bridged metallocene compound (I') to form an ion pair, and organoaluminum compounds (II-3). The catalyst is not particularly limited to this catalyst as long as the obtainable soft propylene copolymer (B) satisfies the specific requirements.

[Chem. 5]

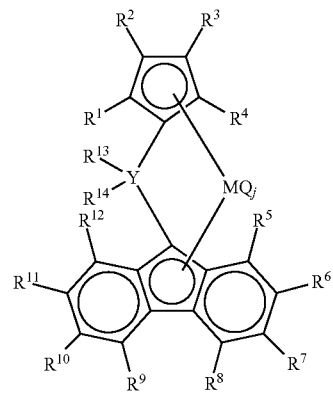

[6]

wherein $R^1$, $R^2$, $R^3$, $R^4$, $R^5$, $R^8$, $R^9$ and $R^{12}$ may be identical to or different from each other and are each an atom or a group selected from a hydrogen atom, a hydrocarbon group and a silicon-containing group;

R[6] and R[11] may be identical to or different from each other and are selected from a hydrogen atom, a hydrocarbon group and a silicon-containing group;

R[7] and R[10] may be identical to or different from each other and are selected from a hydrogen atom, a hydrocarbon group and a silicon-containing group;

R[6], R[7], R[10] and R[11] cannot be all hydrogen atoms at the same time;

R[2] and R[3] may be linked together to form a ring;

adjacent groups of R[5] to R[12] may be linked together to form a ring;

R[13] and R[14] may be identical to or different from each other and are each selected from C6-18 aryl groups, C1-40 alkyl groups, C6-40 alkylaryl groups, C6-20 fluoroaryl groups, C7-40 fluoroalkylaryl groups, C6-20 chloroaryl groups, C7-40 chloroalkylaryl groups, C6-20 bromoaryl groups, C7-40 bromoalkylaryl groups, C6-20 iodoaryl groups and C7-40 iodoalkylaryl groups;

at least one of R[13] and R[14] is selected from C7-18 aryl groups, C6-20 chloroaryl groups, C7-40 chloroalkylaryl groups, C6-20 bromoaryl groups, C7-40 bromoalkylaryl groups, C6-20 iodoaryl groups, C7-40 iodoalkylaryl groups and C7-40 fluoroalkylaryl groups;

M is Ti, Zr or Hf;

Y is carbon or silicon;

Q is selected from a halogen atom, a hydrocarbon group, a neutral and conjugated or non-conjugated diene having 10 or less carbon atoms, an anionic ligand and a neutral ligand capable of coordination by lone pair electrons and may be the same or different when plural; and j is an integer of 1 to 4.

Hereinbelow, specific examples of the bridged metallocene compounds represented by Formula [6] will be described, but the scope of the present invention is not limited thereto. Here, octamethyloctahydrodibenzofluorene refers to a structure represented by Formula [7], octamethyltetrahydrodicyclopentafluorene refers to a structure represented by Formula [8], and dibenzofluorene refers to a structure represented by Formula [9].

[Chem. 6]

[7]
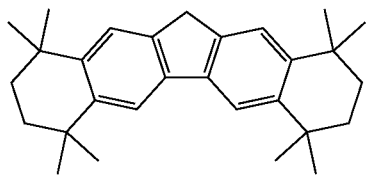

[8]
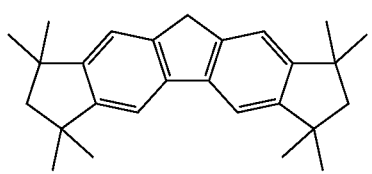

[9]
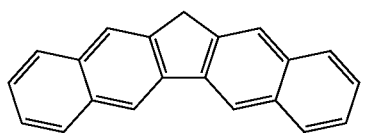

The bridged metallocene compounds include
di(p-chlorophenyl)methylene(cyclopentadienyl)(2,7-di-tert-butylfluorenyl)zirconium dichloride,
di(p-chlorophenyl)methylene(cyclopentadienyl)(3,6-di-tert-butylfluorenyl)zirconium dichloride,
di(p-chlorophenyl)methylene(cyclopentadienyl)(octamethyloctahydrodibenzofluorenyl)zirconium dichloride,
di(p-chlorophenyl)methylene(cyclopentadienyl)(octamethyltetrahydrodicyclopentafluorenyl)zirconium dichloride,
di(p-chlorophenyl)methylene(cyclopentadienyl)(dibenzofluorenyl)zirconium dichloride,
di(p-chlorophenyl)methylene(cyclopentadienyl)(2,7-diphenyl-3,6-di-tert-butylfluorenyl)zirconium dichloride,
di(p-chlorophenyl)methylene(cyclopentadienyl)(2,7-dimethyl-3,6-di-tert-butylfluorenyl)zirconium dichloride,
di(p-chlorophenyl)methylene(cyclopentadienyl)(2,7-(trimethylphenyl)-3,6-di-tert-butylfluorenyl)zirconium dichloride,
di(p-chlorophenyl)methylene(cyclopentadienyl)(2,7-(dimethylphenyl)-3,6-di-tert-butylfluorenyl)zirconium dichloride,
di(p-chlorophenyl)methylene(cyclopentadienyl)(2,3,6,7-tetra-tert-butylfluorenyl)zirconium dichloride,
di(m-chlorophenyl)methylene(cyclopentadienyl)(2,7-di-tert-butylfluorenyl)zirconium dichloride,
di(m-chlorophenyl)methylene(cyclopentadienyl)(3,6-di-tert-butylfluorenyl)zirconium dichloride,
di(m-chlorophenyl)methylene(cyclopentadienyl)(octamethyloctahydrodibenzofluorenyl)zirconium dichloride,
di(m-chlorophenyl)methylene(cyclopentadienyl)(octamethyltetrahydrodicyclopentafluorenyl)zirconium dichloride,
di(m-chlorophenyl)methylene(cyclopentadienyl)(dibenzofluorenyl)zirconium dichloride,
di(m-chlorophenyl)methylene(cyclopentadienyl)(2,7-diphenyl-3,6-di-tert-butylfluorenyl)zirconium dichloride,
di(m-chlorophenyl)methylene (cyclopentadienyl)(2,7-dimethyl-3,6-di-tert-butylfluorenyl)zirconium dichloride,
di(m-chlorophenyl)methylene(cyclopentadienyl)(2,7-(trimethylphenyl)-3,6-di-tert-butylfluorenyl)zirconium dichloride,
di(m-chlorophenyl)methylene(cyclopentadienyl)(2,7-(dimethylphenyl)-3,6-di-tert-butylfluorenyl)zirconium dichloride,
di(m-chlorophenyl)methylene(cyclopentadienyl)(2,3,6,7-tetra-tert-butylfluorenyl)zirconium dichloride,
di(p-bromophenyl)methylene(cyclopentadienyl)(2,7-di-tert-butylfluorenyl)zirconium dichloride,
di(p-bromophenyl)methylene(cyclopentadienyl)(3,6-di-tert-butylfluorenyl)zirconium dichloride,
di(p-bromophenyl)methylene(cyclopentadienyl)(octamethyloctahydrodibenzofluorenyl)zirconium dichloride,
di(p-bromophenyl)methylene(cyclopentadienyl)(octamethyltetrahydrodicyclopentafluorenyl)zirconium dichloride,
di(p-bromophenyl)methylene(cyclopentadienyl)(dibenzofluorenyl)zirconium dichloride,
di(p-bromophenyl)methylene(cyclopentadienyl)(2,7-diphenyl-3,6-di-tert-butylfluorenyl)zirconium dichloride,
di(p-bromophenyl)methylene(cyclopentadienyl)(2,7-dimethyl-3,6-di-tert-butylfluorenyl)zirconium dichloride,
di(p-bromophenyl)methylene(cyclopentadienyl)(2,7-(trimethylphenyl)-3,6-di-tert-butylfluorenyl)zirconium dichloride,
di(p-bromophenyl)methylene(cyclopentadienyl)(2,7-(dimethylphenyl)-3,6-di-tert-butylfluorenyl)zirconium dichloride,
di(p-bromophenyl)methylene(cyclopentadienyl)(2,3,6,7-tetra-tert-butylfluorenyl)zirconium dichloride,
di(m-bromophenyl)methylene(cyclopentadienyl)(2,7-di-tert-butylfluorenyl)zirconium dichloride, di(m-bromophenyl)methylene(cyclopentadienyl)(3,6-di-tert-butylfluorenyl)zirconium dichloride,
di(m-bromophenyl)methylene(cyclopentadienyl)(octamethyloctahydrodibenzofluorenyl)zirconium dichloride,
di(m-bromophenyl)methylene(cyclopentadienyl)(octamethyltetrahydrodicyclopentafluorenyl)zirconium dichloride,
di(m-bromophenyl)methylene(cyclopentadienyl)(dibenzofluorenyl)zirconium dichloride,
di(m-bromophenyl)methylene(cyclopentadienyl)(2,7-diphenyl-3,6-di-tert-butylfluorenyl)zirconium dichloride,
di(m-bromophenyl)methylene(cyclopentadienyl)(2,17-dimethyl-3,6-di-tert-butylfluorenyl)zirconium dichloride,
di(m-bromophenyl)methylene(cyclopentadienyl)(2,7-(trimethylphenyl)-3,6-di-tert-butylfluorenyl)zirconium dichloride,
di(m-bromophenyl)methylene(cyclopentadienyl)(2,7-(dimethylphenyl)-3,6-di-tert-butylfluorenyl)zirconium dichloride,
di(m-bromophenyl)methylene(cyclopentadienyl)(2,3,6,7-tetra-tert-butylfluorenyl)zirconium dichloride,
di(p-iodophenyl)methylene(cyclopentadienyl)(2,7-di-tert-butylfluorenyl)zirconium dichloride,
di(p-iodophenyl)methylene(cyclopentadienyl)(3,6-di-tert-butylfluorenyl)zirconium dichloride,
di(p-iodophenyl)methylene(cyclopentadienyl)(octamethyloctahydrodibenzofluorenyl)zirconium dichloride,
di(p-iodophenyl)methylene(cyclopentadienyl)(octamethyltetrahydrodicyclopentafluorenyl)zirconium dichloride,
di(p-iodophenyl)methylene(cyclopentadienyl)(dibenzofluorenyl)zirconium dichloride,
di(p-iodophenyl)methylene(cyclopentadienyl)(2,7-diphenyl-3,6-di-tert-butylfluorenyl)zirconium dichloride,
di(p-iodophenyl)methylene(cyclopentadienyl)(2,7-dimethyl-3,6-di-tert-butylfluorenyl)zirconium dichloride,
di(p-iodophenyl)methylene(cyclopentadienyl)(2,7-(trimethylphenyl)-3,6-di-tert-butylfluorenyl)zirconium dichloride,
di(p-iodophenyl)methylene(cyclopentadienyl)(2,7-(dimethylphenyl)-3,6-di-tert-butylfluorenyl)zirconium dichloride,
di(p-iodophenyl)methylene(cyclopentadienyl)(2,3,6,7-tetra-tert-butylfluorenyl)zirconium dichloride,
di(m-trifluoromethyl-phenyl)methylene(cyclopentadienyl)(2,7-di-tert-butylfluorenyl)zirconium dichloride,
di(m-trifluoromethyl-phenyl)methylene(cyclopentadienyl)(3,6-di-tert-butylfluorenyl)zirconium dichloride,
di(m-trifluoromethyl-phenyl)methylene(cyclopentadienyl)(octamethyloctahydrodibenzofluorenyl)zirconium dichloride,
di(m-trifluoromethyl-phenyl)methylene(cyclopentadienyl)(octamethyltetrahydrodicyclopentafluorenyl)zirconium dichloride,
di(m-trifluoromethyl-phenyl)methylene(cyclopentadienyl)(dibenzofluorenyl)zirconium dichloride,
di(m-trifluoromethyl-phenyl)methylene(cyclopentadienyl)(2,7-diphenyl-3,6-di-tert-butylfluorenyl)zirconium dichloride,
di(m-trifluoromethyl-phenyl)methylene(cyclopentadienyl)(2,7-dimethyl-3,6-di-tert-butylfluorenyl)zirconium dichloride,
di(m-trifluoromethyl-phenyl)methylene(cyclopentadienyl)(2,7-(trimethylphenyl)-3,6-di-tert-butylfluorenyl)zirconium dichloride,
di(m-trifluoromethyl-phenyl)methylene(cyclopentadienyl)(2,7-(dimethylphenyl)-3,6-di-tert-butylfluorenyl)zirconium dichloride,
di(m-trifluoromethyl-phenyl)methylene(cyclopentadienyl)(2,3,6,7-tetra-tert-butylfluorenyl)zirconium dichloride,
di(p-trifluoromethyl-phenyl)methylene(cyclopentadienyl)(2,7-di-tert-butylfluorenyl)zirconium dichloride,
di(p-trifluoromethyl-phenyl)methylene(cyclopentadienyl)(3,6-di-tert-butylfluorenyl)zirconium dichloride,
di(p-trifluoromethyl-phenyl)methylene(cyclopentadienyl)(octamethyloctahydrodibenzofluorenyl)zirconium dichloride,
di(p-trifluoromethyl-phenyl)methylene(cyclopentadienyl)(octamethyltetrahydrodicyclopentafluorenyl)zirconium dichloride,
di(p-trifluoromethyl-phenyl)methylene(cyclopentadienyl)(dibenzofluorenyl)zirconium dichloride,
di(p-trifluoromethyl-phenyl)methylene(cyclopentadienyl)(2,7-diphenyl-3,6-di-tert-butylfluorenyl)zirconium dichloride,
di(p-trifluoromethyl-phenyl)methylene(cyclopentadienyl)(2,7-dimethyl-3,6-di-tert-butylfluorenyl)zirconium dichloride,
di(p-trifluoromethyl-phenyl)methylene(cyclopentadienyl)(2,7-(trimethylphenyl)-3,6-di-tert-butylfluorenyl)zirconium dichloride,
di(p-trifluoromethyl-phenyl)methylene(cyclopentadienyl)(2,7-(dimethylphenyl)-3,6-di-tert-butylfluorenyl)zirconium dichloride,
di(p-trifluoromethyl-phenyl)methylene(cyclopentadienyl)(2,3,6,7-tetra-tert-butylfluorenyl)zirconium dichloride,
di(p-trichloromethyl-phenyl)methylene(cyclopentadienyl)(2,7-di-tert-butylfluorenyl)zirconium dichloride,
di(p-trichloromethyl-phenyl)methylene(cyclopentadienyl)(3,6-di-tert-butylfluorenyl)zirconium dichloride,
di(p-trichloromethyl-phenyl)methylene(cyclopentadienyl)(octamethyloctahydrodibenzofluorenyl)zirconium dichloride,
di(p-trichloromethyl-phenyl)methylene(cyclopentadienyl)(octamethyltetrahydrodicyclopentafluorenyl)zirconium dichloride,
di(p-trichloromethyl-phenyl)methylene(cyclopentadienyl)(dibenzofluorenyl)zirconium dichloride,
di(p-trichloromethyl-phenyl)methylene(cyclopentadienyl)(2,7-diphenyl-3,6-di-tert-butylfluorenyl)zirconium dichloride,
di(p-trichloromethyl-phenyl)methylene(cyclopentadienyl)(2,7-dimethyl-3,6-di-tert-butylfluorenyl)zirconium dichloride,
di(p-trichloromethyl-phenyl)methylene(cyclopentadienyl)(2,7-(trimethylphenyl)-3,6-di-tert-butylfluorenyl)zirconium dichloride,
di(p-trichloromethyl-phenyl)methylene(cyclopentadienyl)(2,7-(dimethylphenyl)-3,6-di-tert-butylfluorenyl)zirconium dichloride,
di(p-trichloromethyl-phenyl)methylene(cyclopentadienyl)(2,3,6,7-tetra-tert-butylfluorenyl)zirconium dichloride,
di(m-trichloromethyl-phenyl)methylene(cyclopentadienyl)(2,7-di-tert-butylfluorenyl)zirconium dichloride,
di(m-trichloromethyl-phenyl)methylene(cyclopentadienyl)(3,6-di-tert-butylfluorenyl)zirconium dichloride,
di(m-trichloromethyl-phenyl)methylene(cyclopentadienyl)(octamethyloctahydrodibenzofluorenyl)zirconium dichloride,
di(m-trichloromethyl-phenyl)methylene(cyclopentadienyl)(octamethyltetrahydrodicyclopentafluorenyl)zirconium dichloride,
di(m-trichloromethyl-phenyl)methylene(cyclopentadienyl)(dibenzofluorenyl)zirconium dichloride,
di(m-trichloromethyl-phenyl)methylene(cyclopentadienyl)(2,7-diphenyl-3,6-di-tert-butylfluorenyl)zirconium dichloride, di(m-trichloromethyl-phenyl)methylene(cyclopentadienyl)(2,7-dimethyl-3,6-di-tert-butylfluorenyl)zirconium dichloride,
di(m-trichloromethyl-phenyl)methylene(cyclopentadienyl)(2,7-(trimethylphenyl)-3,6-di-tert-butylfluorenyl)zirconium dichloride,
di(m-trichloromethyl-phenyl)methylene (cyclopentadienyl)(2,7-(dimethylphenyl)-3,6-di-tert-butylfluorenyl)zirconium dichloride,
di(m-trichloromethyl-phenyl)methylene(cyclopentadienyl)(2,3,6,7-tetra-tert-butylfluorenyl)zirconium dichloride,
di(p-biphenyl)methylene(cyclopentadienyl)(2,7-di-tert-butylfluorenyl)zirconium dichloride,
di(p-biphenyl)methylene(cyclopentadienyl)(3,6-di-tert-butylfluorenyl)zirconium dichloride,
di(p-biphenyl)methylene(cyclopentadienyl)(octamethyloctahydrodibenzofluorenyl)zirconium dichloride,
di(p-biphenyl)methylene(cyclopentadienyl)(octamethyltetrahydrodicyclopentafluorenyl)zirconium dichloride,
di(p-biphenyl)methylene(cyclopentadienyl)(dibenzofluorenyl)zirconium dichloride,
di(p-biphenyl)methylene(cyclopentadienyl)(2,7-diphenyl-3,6-di-tert-butylfluorenyl)zirconium dichloride,
di(p-biphenyl)methylene(cyclopentadienyl)(2,7-dimethyl-3,6-di-tert-butylfluorenyl)zirconium dichloride,
di(p-biphenyl)methylene(cyclopentadienyl)(2,7-(trimethylphenyl)-3,6-di-tert-butylfluorenyl)zirconium dichloride,
di(p-biphenyl)methylene(cyclopentadienyl)(2,7-(dimethylphenyl)-3,6-di-tert-butylfluorenyl)zirconium dichloride,
di(p-biphenyl)methylene(cyclopentadienyl)(2,3,6,7-tetra-tert-butylfluorenyl)zirconium dichloride,
di(3,5-ditrifluoromethyl-phenyl)methylene(cyclopentadienyl)(2,7-di-tert-butylfluorenyl)zirconium dichloride,
di(3,5-ditrifluoromethyl-phenyl)methylene(cyclopentadienyl)(3,6-di-tert-butylfluorenyl)zirconium dichloride,
di(3,5-ditrifluoromethyl-phenyl)methylene(cyclopentadienyl)(octamethyloctahydrodibenzofluorenyl)zirconium dichloride,
di(3,5-ditrifluoromethyl-phenyl)methylene(cyclopentadienyl)(octamethyltetrahydrodicyclopentafluorenyl)zirconium dichloride,
di(3,5-ditrifluoromethyl-phenyl)methylene(cyclopentadienyl)(dibenzofluorenyl)zirconium dichloride,
di(3,5-ditrifluoromethyl-phenyl)methylene(cyclopentadienyl)(2,7-diphenyl-3,6-di-tert-butylfluorenyl)zirconium dichloride,
di(3,5-ditrifluoromethyl-phenyl)methylene(cyclopentadienyl)(2,7-dimethyl-3,6-di-tert-butylfluorenyl)zirconium dichloride,
di(3,5-ditrifluoromethyl-phenyl)methylene(cyclopentadienyl)(2,7-(trimethylphenyl)-3,6-di-tert-butylfluorenyl)zirconium dichloride,
di(3,5-ditrifluoromethyl-phenyl)methylene(cyclopentadienyl)(2,7-(dimethylphenyl)-3,6-di-tert-butylfluorenyl)zirconium dichloride,
di(3,5-ditrifluoromethyl-phenyl)methylene(cyclopentadienyl)(2,3,6,7-tetra-tert-butylfluorenyl)zirconium dichloride,
di(3,5-dichloromethyl-phenyl)methylene(cyclopentadienyl)(2,7-di-tert-butylfluorenyl)zirconium dichloride,
di(3,5-dichloromethyl-phenyl)methylene(cyclopentadienyl)(3,6-di-tert-butylfluorenyl)zirconium dichloride,
di(3,5-dichloromethyl-phenyl)methylene(cyclopentadienyl)(octamethyloctahydrodibenzofluorenyl)zirconium dichloride,
di(3,5-dichloromethyl-phenyl)methylene(cyclopentadienyl)(octamethyltetrahydrodicyclopentafluorenyl)zirconium dichloride,
di(3,5-dichloromethyl-phenyl)methylene(cyclopentadienyl)(dibenzofluorenyl)zirconium dichloride,
di(3,5-dichloromethyl-phenyl)methylene(cyclopentadienyl)(2,7-diphenyl-3,6-di-tert-butylfluorenyl)zirconium dichloride,
di(3,5-dichloromethyl-phenyl)methylene(cyclopentadienyl)(2,7-dimethyl-3,6-di-tert-butylfluorenyl)zirconium dichloride,
di(3,5-dichloromethyl-phenyl)methylene(cyclopentadienyl)(2,7-(trimethylphenyl)-3,6-di-tert-butylfluorenyl)zirconium dichloride,
di(3,5-dichloromethyl-phenyl)methylene(cyclopentadienyl)(2,7-(dimethylphenyl)-3,6-di-tert-butylfluorenyl)zirconium dichloride,
di(3,5-dichloromethyl-phenyl)methylene(cyclopentadienyl)(2,3,6,7-tetra-tert-butylfluorenyl)zirconium dichloride,
di(4-chloronaphthyl)methylene(cyclopentadienyl)(2,7-di-tert-butylfluorenyl)zirconium dichloride,
di(4-chloronaphthyl)methylene(cyclopentadienyl)(3,6-di-tert-butylfluorenyl)zirconium dichloride,
di(4-chloronaphthyl)methylene(cyclopentadienyl)(octamethyloctahydrodibenzofluorenyl)zirconium dichloride,
di(4-chloronaphthyl)methylene(cyclopentadienyl)(octamethyltetrahydrodicyclopentafluorenyl)zirconium dichloride,
di(4-chloronaphthyl)methylene(cyclopentadienyl)(dibenzofluorenyl)zirconium dichloride,
di(4-chloronaphthyl)methylene(cyclopentadienyl)(2,7-diphenyl-3,6-di-tert-butylfluorenyl)zirconium dichloride,
di(4-chloronaphthyl)methylene(cyclopentadienyl)(2,7-dimethyl-3,6-di-tert-butylfluorenyl)zirconium dichloride,
di(4-chloronaphthyl)methylene(cyclopentadienyl)(2,7-(trimethylphenyl)-3,6-di-tert-butylfluorenyl)zirconium dichloride,
di(4-chloronaphthyl)methylene(cyclopentadienyl)(2,7-(dimethylphenyl)-3,6-di-tert-butylfluorenyl)zirconium dichloride,
di(4-chloronaphthyl)methylene(cyclopentadienyl)(2,3,6,7-tetra-tert-butylfluorenyl)zirconium dichloride,
di(3-chloronaphthyl)methylene(cyclopentadienyl)(2,7-di-tert-butylfluorenyl)zirconium dichloride,
di(3-chloronaphthyl)methylene(cyclopentadienyl)(3,6-di-tert-butylfluorenyl)zirconium dichloride,
di(3-chloronaphthyl)methylene(cyclopentadienyl)(octamethyloctahydrodibenzofluorenyl)zirconium dichloride,
di(3-chloronaphthyl)methylene(cyclopentadienyl)(octamethyltetrahydrodicyclopentafluorenyl)zirconium dichloride,
di(3-chloronaphthyl)methylene(cyclopentadienyl)(dibenzofluorenyl)zirconium dichloride,
di(3-chloronaphthyl)methylene(cyclopentadienyl)(2,7-diphenyl-3,6-di-tert-butylfluorenyl)zirconium dichloride,
di(3-chloronaphthyl)methylene(cyclopentadienyl)(2,7-dimethyl-3,6-di-tert-butylfluorenyl)zirconium dichloride,
di(3-chloronaphthyl)methylene(cyclopentadienyl)(2,7-(trimethylphenyl)-3,6-di-tert-butylfluorenyl)zirconium dichloride,
di(3-chloronaphthyl)methylene(cyclopentadienyl)(2,7-(dimethylphenyl)-3,6-di-tert-butylfluorenyl)zirconium dichloride,
di(3-chloronaphthyl)methylene(cyclopentadienyl)(2,3,6,7-tetra-tert-butylfluorenyl)zirconium dichloride,
di(5-chloronaphthyl)methylene(cyclopentadienyl)(2,7-di-tert-butylfluorenyl)zirconium dichloride, di(5-chloronaphthyl)methylene(cyclopentadienyl)(3,6-di-tert-butylfluorenyl)zirconium dichloride,
di(5-chloronaphthyl)methylene(cyclopentadienyl)(octamethyloctahydrodibenzofluorenyl)zirconium dichloride,
di(5-chloronaphthyl)methylene(cyclopentadienyl)(octamethyltetrahydrodicyclopentafluorenyl)zirconium dichloride,
di(5-chloronaphthyl)methylene(cyclopentadienyl)(dibenzofluorenyl)zirconium dichloride,
di(5-chloronaphthyl)methylene(cyclopentadienyl)(2,7-diphenyl-3,6-di-tert-butylfluorenyl)zirconium dichloride,
di(5-chloronaphthyl)methylene(cyclopentadienyl)(2,7-dimethyl-3,6-di-tert-butylfluorenyl)zirconium dichloride,
di(5-chloronaphthyl)methylene(cyclopentadienyl)(2,7-(trimethylphenyl)-3,6-di-tert-butylfluorenyl)zirconium dichloride,
di(5-chloronaphthyl)methylene(cyclopentadienyl)(2,7-(dimethylphenyl)-3,6-di-tert-butylfluorenyl)zirconium dichloride,
di(5-chloronaphthyl)methylene(cyclopentadienyl)(2,3,6,7-tetra-tert-butylfluorenyl)zirconium dichloride,
phenyl(p-chlorophenyl)methylene(cyclopentadienyl)(2,7-di-tert-butylfluorenyl)zirconium dichloride,
phenyl(p-chlorophenyl)methylene(cyclopentadienyl)(3,6-di-tert-butylfluorenyl)zirconium dichloride,
phenyl(p-chlorophenyl)methylene(cyclopentadienyl)(octamethyloctahydrodibenzofluorenyl)zirconium dichloride,
phenyl(p-chlorophenyl)methylene(cyclopentadienyl)(octamethyltetrahydrodicyclopentafluorenyl)zirconium dichloride,
phenyl(p-chlorophenyl)methylene(cyclopentadienyl)(dibenzofluorenyl)zirconium dichloride,
phenyl(p-chlorophenyl)methylene(cyclopentadienyl)(2,7-diphenyl-3,6-di-tert-butylfluorenyl)zirconium dichloride,
phenyl(p-chlorophenyl)methylene(cyclopentadienyl)(2,7-dimethyl-3,6-di-tert-butylfluorenyl)zirconium dichloride,
phenyl(p-chlorophenyl)methylene(cyclopentadienyl)(2,7-(trimethylphenyl)-3,6-di-tert-butylfluorenyl)zirconium dichloride,
phenyl(p-chlorophenyl)methylene(cyclopentadienyl)(2,7-(dimethylphenyl)-3,6-di-tert-butylfluorenyl)zirconium dichloride,
phenyl(p-chlorophenyl)methylene(cyclopentadienyl)(2,3,6,7-tetra-tert-butylfluorenyl)zirconium dichloride,
phenyl(m-chlorophenyl)methylene(cyclopentadienyl)(2,7-di-tert-butylfluorenyl)zirconium dichloride,
phenyl(m-chlorophenyl)methylene(cyclopentadienyl)(3,6-di-tert-butylfluorenyl)zirconium dichloride,
phenyl(m-chlorophenyl)methylene(cyclopentadienyl)(octamethyloctahydrodibenzofluorenyl)zirconium dichloride,
phenyl(m-chlorophenyl)methylene(cyclopentadienyl)(octamethyltetrahydrodicyclopentafluorenyl)zirconium dichloride,
phenyl(m-chlorophenyl)methylene(cyclopentadienyl)(dibenzofluorenyl)zirconium dichloride,
phenyl(m-chlorophenyl)methylene(cyclopentadienyl)(2,7-diphenyl-3,6-di-tert-butylfluorenyl)zirconium dichloride,
phenyl(m-chlorophenyl)methylene(cyclopentadienyl)(2,7-dimethyl-3,6-di-tert-butylfluorenyl)zirconium dichloride,
phenyl(m-chlorophenyl)methylene(cyclopentadienyl)(2,7-(trimethylphenyl)-3,6-di-tert-butylfluorenyl)zirconium dichloride,
phenyl(m-chlorophenyl)methylene(cyclopentadienyl)(2,7-(dimethylphenyl)-3,6-di-tert-butylfluorenyl)zirconium dichloride,
phenyl(m-chlorophenyl)methylene(cyclopentadienyl)(2,3,6,7-tetra-tert-butylfluorenyl)zirconium dichloride,
phenyl(m-trifluoromethyl-phenyl)methylene(cyclopentadienyl)(2,7-di-tert-butylfluorenyl)zirconium dichloride,
phenyl(m-trifluoromethyl-phenyl)methylene(cyclopentadienyl)(3,6-di-tert-butylfluorenyl)zirconium dichloride,
phenyl(m-trifluoromethyl-phenyl)methylene(cyclopentadienyl)(octamethyloctahydrodibenzofluorenyl)zirconium dichloride,
phenyl(m-trifluoromethyl-phenyl)methylene(cyclopentadienyl)(octamethyltetrahydrodicyclopentafluorenyl)zirconium dichloride,
phenyl(m-trifluoromethyl-phenyl)methylene(cyclopentadienyl)(dibenzofluorenyl)zirconium dichloride,
phenyl(m-trifluoromethyl-phenyl)methylene(cyclopentadienyl)(2,7-diphenyl-3,6-di-tert-butylfluorenyl)zirconium dichloride,
phenyl(m-trifluoromethyl-phenyl)methylene(cyclopentadienyl)(2,7-dimethyl-3,6-di-tert-butylfluorenyl)zirconium dichloride,
phenyl(m-trifluoromethyl-phenyl)methylene(cyclopentadienyl)(2,7-(trimethylphenyl)-3,6-di-tert-butylfluorenyl)zirconium dichloride,
phenyl(m-trifluoromethyl-phenyl)methylene(cyclopentadienyl)(2,7-(dimethylphenyl)-3,6-di-tert-butylfluorenyl)zirconium dichloride,
phenyl(m-trifluoromethyl-phenyl)methylene(cyclopentadienyl)(2,3,6,7-tetra-tert-butylfluorenyl)zirconium dichloride,
naphthyl(p-chlorophenyl)methylene(cyclopentadienyl)(2,7-di-tert-butylfluorenyl)zirconium dichloride,
naphthyl(p-chlorophenyl)methylene(cyclopentadienyl)(3,6-di-tert-butylfluorenyl)zirconium dichloride,
naphthyl(p-chlorophenyl)methylene(cyclopentadienyl)(octamethyloctahydrodibenzofluorenyl)zirconium dichloride,
naphthyl(p-chlorophenyl)methylene(cyclopentadienyl)(octamethyltetrahydrodicyclopentafluorenyl)zirconium dichloride,
naphthyl(p-chlorophenyl)methylene(cyclopentadienyl)(dibenzofluorenyl)zirconium dichloride,
naphthyl(p-chlorophenyl)methylene(cyclopentadienyl)(2,7-diphenyl-3,6-di-tert-butylfluorenyl)zirconium dichloride,
naphthyl(p-chlorophenyl)methylene(cyclopentadienyl)(2,7-dimethyl-3,6-di-tert-butylfluorenyl)zirconium dichloride,
naphthyl(p-chlorophenyl)methylene(cyclopentadienyl)(2,7-(trimethylphenyl)-3,6-di-tert-butylfluorenyl)zirconium dichloride,
naphthyl(p-chlorophenyl)methylene(cyclopentadienyl)(2,7-(dimethylphenyl)-3,6-di-tert-butylfluorenyl)zirconium dichloride,
naphthyl(p-chlorophenyl)methylene(cyclopentadienyl)(2,3,6,7-tetra-tert-butylfluorenyl)zirconium dichloride,
naphthyl(m-chlorophenyl)methylene(cyclopentadienyl)(2,7-di-tert-butylfluorenyl)zirconium dichloride,
naphthyl(m-chlorophenyl)methylene(cyclopentadienyl)(3,6-di-tert-butylfluorenyl)zirconium dichloride,
naphthyl(m-chlorophenyl)methylene(cyclopentadienyl)(octamethyloctahydrodibenzofluorenyl)zirconium dichloride,
naphthyl(m-chlorophenyl)methylene(cyclopentadienyl)(octamethyltetrahydrodicyclopentafluorenyl)zirconium dichloride,
naphthyl(m-chlorophenyl)methylene(cyclopentadienyl)(dibenzo fluorenyl)zirconium dichloride, naphthyl(m-chlorophenyl)methylene(cyclopentadienyl)(2,7-diphenyl-3,6-di-tert-butylfluorenyl)zirconium dichloride,
naphthyl(m-chlorophenyl)methylene(cyclopentadienyl)(2,7-dimethyl-3,6-di-tert-butylfluorenyl)zirconium dichloride,
naphthyl(m-chlorophenyl)methylene(cyclopentadienyl)(2,7-(trimethylphenyl)-3,6-di-tert-butylfluorenyl)zirconium dichloride,
naphthyl(m-chlorophenyl)methylene(cyclopentadienyl)(2,7-(dimethylphenyl)-3,6-di-tert-butylfluorenyl)zirconium dichloride,
naphthyl(m-chlorophenyl)methylene(cyclopentadienyl)(2,3,6,7-tetra-tert-butylfluorenyl)zirconium dichloride,
naphthyl(m-trifluoromethyl-phenyl)methylene(cyclopentadienyl)(2,7-di-tert-butylfluorenyl)zirconium dichloride,
naphthyl(m-trifluoromethyl-phenyl)methylene(cyclopentadienyl)(3,6-di-tert-butylfluorenyl)zirconium dichloride,
naphthyl(m-trifluoromethyl-phenyl)methylene(cyclopentadienyl)(octamethyloctahydrodibenzofluorenyl)zirconium dichloride,
naphthyl(m-trifluoromethyl-phenyl)methylene(cyclopentadienyl)(octamethyltetrahydrodicyclopentafluorenyl)zirconium dichloride,
naphthyl(m-trifluoromethyl-phenyl)methylene(cyclopentadienyl)(dibenzofluorenyl)zirconium dichloride,
naphthyl(m-trifluoromethyl-phenyl)methylene(cyclopentadienyl)(2,7-diphenyl-3,6-di-tert-butylfluorenyl)zirconium dichloride,
naphthyl(m-trifluoromethyl-phenyl)methylene(cyclopentadienyl)(2,7-dimethyl-3,6-di-tert-butylfluorenyl)zirconium dichloride,
naphthyl(m-trifluoromethyl-phenyl)methylene(cyclopentadienyl)(2,7-(trimethylphenyl)-3,6-di-tert-butylfluorenyl)zirconium dichloride,
naphthyl(m-trifluoromethyl-phenyl)methylene(cyclopentadienyl)(2,7-(dimethylphenyl)-3,6-di-tert-butylfluorenyl)zirconium dichloride,
naphthyl(m-trifluoromethyl-phenyl)methylene(cyclopentadienyl)(2,3,6,7-tetra-tert-butylfluorenyl)zirconium dichloride,
(p-tolyl)(p-chlorophenyl)methylene(cyclopentadienyl)(2,7-di-tert-butylfluorenyl)zirconium dichloride,
(p-tolyl)(p-chlorophenyl)methylene(cyclopentadienyl)(3,6-di-tert-butylfluorenyl)zirconium dichloride,
(p-tolyl)(p-chlorophenyl)methylene(cyclopentadienyl)(octamethyloctahydrodibenzofluorenyl)zirconium dichloride,
(p-tolyl)(p-chlorophenyl)methylene(cyclopentadienyl)(octamethyltetrahydrodicyclopentafluorenyl)zirconium dichloride,
(p-tolyl)(p-chlorophenyl)methylene(cyclopentadienyl)(dibenzofluorenyl)zirconium dichloride,
(p-tolyl)(p-chlorophenyl)methylene(cyclopentadienyl)(2,7-diphenyl-3,6-di-tert-butylfluorenyl)zirconium dichloride,
(p-tolyl)(p-chlorophenyl)methylene(cyclopentadienyl)(2,7-dimethyl-3,6-di-tert-butylfluorenyl)zirconium dichloride,
(p-tolyl)(p-chlorophenyl)methylene(cyclopentadienyl)(2,7-(trimethylphenyl)-3,6-di-tert-butylfluorenyl)zirconium dichloride,
(p-tolyl)(p-chlorophenyl)methylene(cyclopentadienyl)(2,7-(dimethylphenyl)-3,6-di-tert-butylfluorenyl)zirconium dichloride,
(p-tolyl)(p-chlorophenyl)methylene(cyclopentadienyl)(2,3,6,7-tetra-tert-butylfluorenyl)zirconium dichloride,
(p-tolyl)(m-chlorophenyl)methylene(cyclopentadienyl)(2,7-di-tert-butylfluorenyl)zirconium dichloride,
(p-tolyl)(m-chlorophenyl)methylene(cyclopentadienyl)(3,6-di-tert-butylfluorenyl)zirconium dichloride,
(p-tolyl)(m-chlorophenyl)methylene(cyclopentadienyl)(octamethyloctahydrodibenzofluorenyl)zirconium dichloride,
(p-tolyl)(m-chlorophenyl)methylene(cyclopentadienyl)(octamethyltetrahydrodicyclopentafluorenyl)zirconium dichloride,
(p-tolyl)(m-chlorophenyl)methylene(cyclopentadienyl)(dibenzofluorenyl)zirconium dichloride,
(p-tolyl)(m-chlorophenyl)methylene(cyclopentadienyl)(2,7-diphenyl-3,6-di-tert-butylfluorenyl)zirconium dichloride,
(p-tolyl)(m-chlorophenyl)methylene(cyclopentadienyl)(2,7-dimethyl-3,6-di-tert-butylfluorenyl)zirconium dichloride,
(p-tolyl)(m-chlorophenyl)methylene(cyclopentadienyl)(2,7-(trimethylphenyl)-3,6-di-tert-butylfluorenyl)zirconium dichloride,
(p-tolyl)(m-chlorophenyl)methylene(cyclopentadienyl)(2,7-(dimethylphenyl)-3,6-di-tert-butylfluorenyl)zirconium dichloride,
(p-tolyl)(m-chlorophenyl)methylene(cyclopentadienyl)(2,3,6,7-tetra-tert-butylfluorenyl)zirconium dichloride,
(p-tolyl)(m-trifluoromethyl-phenyl)methylene(cyclopentadienyl)(2,7-di-tert-butylfluorenyl)zirconium dichloride,
(p-tolyl)(m-trifluoromethyl-phenyl)methylene(cyclopentadienyl)(3,6-di-tert-butylfluorenyl)zirconium dichloride,
(p-tolyl)(m-trifluoromethyl-phenyl)methylene(cyclopentadienyl)(octamethyloctahydrodibenzofluorenyl)zirconium dichloride,
(p-tolyl)(m-trifluoromethyl-phenyl)methylene(cyclopentadienyl)(octamethyltetrahydrodicyclopentafluorenyl)zirconium dichloride,
(p-tolyl)(m-trifluoromethyl-phenyl)methylene(cyclopentadienyl)(dibenzofluorenyl)zirconium dichloride,
(p-tolyl)(m-trifluoromethyl-phenyl)methylene(cyclopentadienyl)(2,7-diphenyl-3,6-di-tert-butylfluorenyl)zirconium dichloride,
(p-tolyl)(m-trifluoromethyl-phenyl)methylene(cyclopentadienyl)(2,7-dimethyl-3,6-di-tert-butylfluorenyl)zirconium dichloride,
(p-tolyl)(m-trifluoromethyl-phenyl)methylene(cyclopentadienyl)(2,7-(trimethylphenyl)-3,6-di-tert-butylfluorenyl)zirconium dichloride,
(p-tolyl)(m-trifluoromethyl-phenyl)methylene(cyclopentadienyl)(2,7-(dimethylphenyl)-3,6-di-tert-butylfluorenyl)zirconium dichloride and
(p-tolyl)(m-trifluoromethyl-phenyl)methylene(cyclopentadienyl)(2,3,6,7-tetra-tert-butylfluorenyl)zirconium dichloride.

Examples of the metallocene compounds of Formula [6] further include compounds corresponding to the above compounds except that zirconium is replaced by hafnium or titanium, except that dichloride is replaced by difluoride, dibromide or diiodide, or except that dichloride is replaced by dimethyl or methylethyl.

Examples of the bridged metallocene compounds (I') further include metallocene compounds described in WO 2004/087775.

The bridged metallocene compounds (I') may be produced by known methods. Such methods may be found in WO 04/029062 filed by the present applicant.

The metallocene compounds may be used singly, or two or more kinds may be used in combination.

Production of Soft Propylene Copolymers (B):

In the polymerization, the compounds may be used and added in any manner or order without limitation. For example, the polymerization may be performed as follows.

The compound (I') and the compound (II) are added to a polymerization reactor in any order.

In the above method, two or more of the catalyst components may be brought into contact with each other beforehand.

In the olefin polymerization with the olefin polymerization catalyst as described above, the compound (I') is usually used in an amount of $10^{-9}$ to $10^{-1}$ mol, and preferably $10^{-8}$ to $10^{-2}$ mol per liter of the reaction volume.

The compound (II-1) is used in an amount such that the molar ratio of the compound (II-1) and all the transition metal atoms (M) in the compound (I') [(II-1)/M] is usually 0.01 to 5,000, and preferably 0.05 to 2,000. The compound (II-2) is used in an amount such that the molar ratio of the aluminum atoms in the compound (II-2) and all the transition metal atoms (M) in the compound (I') [(II-2)/M] is usually 1 to 1,000, and preferably 1 to 500. The compound (II-3) is used in an amount such that the molar ratio of the compound (II-3) and all the transition metal atoms (M) in the compound (I') [(II-3)/M] is usually 1 to 10,000, and preferably 1 to 5,000.

The soft propylene copolymer (B) may be obtained by copolymerizing propylene and at least one olefin selected from C2-20 α-olefins (except propylene) in the presence of the olefin polymerization catalyst as described above. The copolymerization is generally performed in a liquid phase. The liquid phase copolymerization generally involves a hydrocarbon solvent, but the α-olefin to be polymerized may be used as a solvent. Examples of the hydrocarbon solvents include but are not limited to:

aliphatic hydrocarbons such as propane, butane, pentane, hexane, heptane, octane, decane, dodecane and kerosene;

alicyclic hydrocarbons such as cyclopentane, cyclohexane and methylcyclopentane; and aromatic hydrocarbons such as benzene, toluene and xylene. The copolymerization may be carried out by a batch process or a continuous process.

The α-olefins used in the polymerization, that is, the α-olefins to be polymerized include ethylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. The α-olefins may be used singly, or two or more kinds may be used in combination.

When the copolymerization is performed by a batch process using the olefin polymerization catalyst, the concentration of the metallocene compound in the polymerization system is usually 0.00005 to 1 mmol, and preferably 0.0001 to 0.50 mmol per liter of the polymerization volume.

The reaction time (the average residence time in the case of continuous copolymerization) may vary depending on conditions such as the catalyst concentration and polymerization temperature, but it is usually 5 minutes to 3 hours, and preferably 10 minutes to 1.5 hours.

Propylene and at least one olefin selected from the C2-20 α-olefins (except propylene) are each supplied to the polymerization system in an amount such that the obtainable soft propylene copolymer (B) will have the specific composition as described above. In the copolymerization, a molecular weight modifier such as hydrogen may be used.

The copolymerization of propylene and at least one olefin selected from the C2-20 α-olefins (except propylene) usually results in a polymerization solution containing the soft propylene/olefin copolymer. The polymerization solution is treated according to conventional methods, and the soft propylene copolymer (B) is obtained.

The copolymerization is usually performed at a temperature of 40 to 200° C., preferably 40 to 180° C., and more preferably 50 to 150° C., and at a pressure of more than 0 to 10 MPa, preferably 0.5 to 10 MPa, and more preferably 0.5 to 7 MPa.

Preferred Embodiments of Soft Propylene Copolymers (B)

Preferred embodiments of the soft propylene copolymers (B) include propylene/butene/ethylene copolymers (B1) and propylene/ethylene copolymers (B2) described below.

Propylene/Butene/Ethylene Copolymers (B1)

Of the soft propylene copolymers (B), the propylene/butene/ethylene copolymers (B1) contain 55 to 90 mol %, preferably 55 to 87 mol % of structural units derived from propylene, 3 to 43 mol %, preferably 10 to 30 mo % of structural units derived from 1-butene, and 2 to 42 mol %, preferably 3 to 35 mol % of structural units derived from ethylene.

The propylene/butene/ethylene copolymers (B1) having this composition show good compatibility with the isotactic propylene polymers (A1).

Propylene/Ethylene Copolymers (B2)

Of the soft propylene copolymers (B), the propylene/ethylene copolymers (B2) contain 55 to 90 mol %, preferably 60 to 85 mol % of structural units derived from propylene, and 10 to 45 mol %, preferably 15 to 40 mol % of structural units derived from ethylene.

The propylene/ethylene copolymers (B2) having this composition show good compatibility with the syndiotactic propylene polymers (A2).

(C) Elastomers

One or more elastomers (C) are selected from ethylene elastomers (C1) containing not less than 61 mol % of ethylene-derived structural units relative to all the structural units, and styrene elastomers (C2) containing 5 to 70 wt % of styrene-derived structural units relative to all the structural units.

The elastomers (C) have a Shore A hardness in the range of 30 to 90. Examples of the elastomers (C) include styrene/butadiene rubbers, hydrides thereof, ethylene/α-olefin random copolymers, ethylene/vinyl acetate copolymers, ethylene/acrylic acid copolymers and ethylene/methyl methacrylate copolymers.

Preferred ethylene elastomers (C1) include ethylene/α-olefin random copolymers. The ethylene/α-olefin random copolymers are generally copolymers of ethylene and a C3-20α-olefin, and preferably copolymers of ethylene and a C3-10 α-olefin. Preferably, the copolymers satisfy the following conditions (x) and (y).

(x) The density (ASTM 1505, 23° C.) is in the range of 0.850 to 0.910 g/cm³, preferably 0.860 to 0.905 g/cm³, and more preferably 0.865 to 0.895 g/cm³.

(y) The melt flow rate (MFR, 190° C., 2.16 kg load) is in the range of 0.1 to 150 g/10 min, and preferably 0.3 to 100 g/10 min.

The ethylene/α-olefin random copolymers generally have a crystallinity of not more than 40%, preferably 0 to 39%, and more preferably 0 to 35% according to X-ray diffractometry.

The C3-20 α-olefins used as comonomers include propylene, 1-butene, 1-pentene, 1-hexene, 4-methylpentene-1,1-octene, 1-decene and 1-dodecene. They may be used singly, or two or more kinds may be used in combination. Of these, propylene, 1-butene, 1-hexene and 1-octene are preferable.

The α-olefin content in the copolymer is generally 3 to 39 mol %, preferably 5 to 30 mol %, and more preferably 5 to 25 mol %.

The copolymers may contain small amounts of other comonomers as required, with examples including dienes such as 1,6-hexadiene and 1,8-octadiene and cyclic olefins such as cyclopentene.

The copolymers may have a linear molecular structure or a branched molecular structure with a long or short side chain.

Different kinds of the ethylene/α-olefin random copolymers may be used as a mixture.

The ethylene/α-olefin random copolymers may be obtained by any methods without limitation, and they may be produced for example by known methods using a vanadium catalyst, a titanium catalyst or a metallocene catalyst. In particular, the copolymers catalyzed by a metallocene catalyst usually have a molecular weight distribution (Mw/Mn) of not more than 3 and are suitably used in the present invention.

The styrene elastomers (C2) include known compounds such as hydrogenated diene polymers containing a styrene compound (including styrene, the same applies hereinafter)/butadiene copolymer block segment, hydrogenated diene polymers containing a polyisoprene block segment and a styrene compound/isoprene copolymer block segment, block copolymers containing a polymer block based on a styrene compound and a polymer block based on a conjugated diene compound, hydrogenated block copolymers containing a polymer block based on a styrene compound and a polymer block based on a conjugated diene compound, and hydrogenated random copolymers containing a styrene compound and a conjugated diene compound. They may be used without limitation. The styrene elastomers may be used singly, or two or more kinds may be used in combination.

The ethylene elastomers (C1) and the styrene elastomers (C2) may be used in combination.

(D) Inorganic Fillers

The inorganic fillers (D) used in the invention are not particularly limited. Examples include metal compounds and inorganic compounds such as glasses, ceramics, talcs and micas. In view of flame retardancy, metal hydroxides, metal carbonates (carbides) and metal oxides are preferably used. The inorganic fillers (D) may be used singly, or two or more kinds may be used in combination.

The inorganic fillers (D) generally have an average particle diameter of 0.1 to 20 μm, and preferably 0.5 to 15 μm as measured by a laser method.

The inorganic fillers (D) may be surface treated with fatty acids such as stearic acid and oleic acid, or organic silanes, or may be aggregates of fine particles having the above-described average particle diameter.

(E) Oils

The oils (E) for use in the invention include paraffin oils, naphthene oils, aromatic oils and silicon oils, with paraffin oils, naphthene oils and silicon oils being preferable.

The oils (E) generally have a kinematic viscosity at 40° C. of 20 to 800 cst (centistokes), and preferably 40 to 600 cst. It is preferable that the oils (E) have a fluidity of 0 to −40° C., preferably 0 to −30° C., and a flash point (COC method) of 200 to 400° C., preferably 250 to 350° C. The propylene resin compositions containing the oils (E) achieve superior low-temperature properties such as low-temperature brittleness and scratch resistance.

The naphthene oils suitably used in the present invention are petroleum softeners that are used in the rubber processing to provide softening effects, material dispersing effects, lubricating effects and improved low-temperature properties. The naphthene oils contain 30 to 45 wt % of naphthene hydrocarbons. The use of such oils provides higher improvements in melt flowability in the shaping of the resin compositions and softness and low-temperature properties of shaped articles, and also suppresses stickiness due to bleeding on the surface of the shaped articles. Of the naphthene oils, those containing not more than 10 wt % of aromatic hydrocarbons are preferably used. Although the reason is unknown, use of such oils prevents bleeding on the surface of the shaped articles.

Suitable silicon oils contain dimethylpolysiloxane as a main component and have a viscosity of 0.40 to 300,000 $mm^2/S$.

(F) Graft Modified Polymers

The material polymers for the graft modified polymers (F) include polymers of one or more α-olefins, and styrene block copolymers. In particular, ethylene polymers, propylene polymers and styrene block copolymers are preferable. The α-olefins include C2-20 α-olefins.

Preferred examples of the ethylene polymers include polyethylenes and ethylene/α-olefin copolymers. Of the ethylene/α-olefin copolymers, copolymers of ethylene and C3-10 α-olefins are preferable. The C3-10 α-olefins include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 1-octene, 3-ethyl-1-hexene, 1-octene and 1-decene. They may be used singly, or two or more kinds may be used in combination. It is particularly preferable that at least one of propylene, 1-butene, 1-hexene and 1-octene is used.

The ethylene polymers preferably contain 75 to 95 mol % of structural units derived from ethylene, and 5 to 20 mol % of structural units derived from at least one compound selected from the C3-10 α-olefins.

The ethylene/α-olefin copolymers desirably have:

(i) a density of 0.855 to 0.910 $g/cm^3$, preferably 0.857 to 0.890 $g/cm^3$;

(ii) a melt flow rate (MFR, 190° C., 2.16 kg load) of 0.1 to 100 g/10 min, preferably 0.1 to 20 g/10 min;

(iii) an index of molecular weight distribution (Mw/Mn) according to GPC in the range of 1.5 to 3.5, preferably 1.5 to 3.0, more preferably 1.8 to 2.5; and (iv) a B value obtained from a $^{13}C$-NMR spectrum based on the following equation in the range of 0.9 to 1.5, preferably 1.0 to 1.2.

$$B \text{ value} = [POE]/(2 \cdot [PE][PO])$$

wherein [PE] is a molar fraction of ethylene-derived structural units in the copolymer, [PO] is a molar fraction of α-olefin-derived structural units in the copolymer, and [POE] is a proportion of ethylene/α-olefin chains relative to all the dyad chains in the copolymer.

The ethylene/α-olefin copolymers preferably have the same properties as those of the ethylene/α-olefin copolymers used as the polymers (A). The kinds of comonomers, density and molecular weight of the copolymers may be the same or different from those of the polymers (A).

The graft modified polymers (F) may be produced by graft modifying the α-olefin polymers or styrene block copolymers with vinyl compounds having a polar group. Examples of the vinyl compounds include vinyl compounds having an oxygen-containing group such as acid, acid anhydride, ester, alcohol, epoxy or ether, vinyl compounds having a nitrogen-containing group such as isocyanate or amide, and vinyl compounds having a silicon-containing group such as vinyl silane.

Of these, the vinyl compounds having an oxygen-containing group are preferable, and in detail unsaturated epoxy monomers, unsaturated carboxylic acids and derivatives thereof are preferable.

The unsaturated epoxy monomers include unsaturated glycidyl ethers and unsaturated glycidyl esters (e.g. glycidyl methacrylate).

The unsaturated carboxylic acids include acrylic acid, maleic acid, fumaric acid, tetrahydrophthalic acid, itaconic acid, citraconic acid, crotonic acid, isocrotonic acid and Nadic Acid™ (endocis-bicyclo[2,2,1]hept-5-ene-2,3-dicarboxylic acid).

The derivatives of the unsaturated carboxylic acids include halides, amide compounds, imide compounds, acid anhydrides and ester compounds of the above unsaturated carboxylic acids, with specific examples including malenyl chloride, maleimide, maleic anhydride, citraconic anhydride, monomethyl maleate, dimethyl maleate and glycidyl maleate.

Of these, the unsaturated dicarboxylic acids and anhydrides thereof are more preferable, and maleic acid, Nadic acid™ and anhydrides of these acids are particularly preferable.

The material ethylene copolymers may be grafted with the unsaturated carboxylic acids or derivatives thereof at any graft positions without limitation. That is, the unsaturated carboxylic acids or derivatives thereof may bond to any carbon atoms of the ethylene polymers.

The graft modified polymers (F) may be produced by known methods, for example as follows.

(1) The material polymer is molten in an extruder or the like, and the unsaturated carboxylic acid or the like is added to and graft copolymerized with the polymer.

(2) The material polymer is dissolved in a solvent, and the unsaturated carboxylic acid or the like is added to and graft copolymerized with the polymer.

In these methods, the grafting reaction is preferably carried out in the presence of a radical initiator in order to graft the monomer such as the unsaturated carboxylic acid efficiently.

The radical initiators include organic peroxides and azo compounds.

The organic peroxides include benzoyl peroxide, dichlorobenzoyl peroxide and dicumyl peroxide. The azo compounds include azobisisobutyronitrile and dimethyl azoisobutyrate.

Preferred radical initiators include dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene.

The radical initiators may be generally used in amounts of 0.001 to 1 part by weight, preferably 0.003 to 0.5 part by weight, and more preferably 0.05 to 0.3 part by weight based on 100 parts by weight of the material polymer.

The graft reaction with or without the radical initiators may be performed at a reaction temperature of 60 to 350° C., and preferably 150 to 300° C.

The graft modified polymer (F) is grafted with the polar group-containing vinyl compound at 0.01 to 10 wt %, and preferably 0.05 to 5 wt % based on 100 wt % of the graft modified polymer. The use of the graft modified polymers (F) increases the interaction among the inorganic fillers and the propylene polymers, propylene/α-olefin random copolymers and elastomers, and the obtainable shaped articles show excellent balance between tensile strength and scratch resistance.

Propylene Resin Compositions and Shaped Articles

The propylene resin compositions according to the present invention include 0 to 80 wt % of the propylene polymers (A), 5 to 85 wt % of the soft propylene copolymers (B), 0 to 40 wt % of the elastomers (C) and 15 to 80 wt % of the inorganic fillers (D) (wherein the total of (A), (B), (C) and (D) is 100 wt %).

Specific examples of the propylene resin compositions containing the propylene polymers (A) and the soft propylene copolymers (B) include a propylene resin composition 1 that contains the isotactic propylene polymer (A1), the propylene/butene/ethylene copolymer (B1) and the inorganic filler (D), and a propylene resin composition 2 that contains the syndiotactic propylene polymer (A2), the propylene/ethylene copolymer (B2) and the inorganic filler (D).

The propylene resin composition 1 contains the isotactic propylene polymer (A1) at 0 to 80 wt %, preferably 0 to 70 wt %, more preferably 5 to 60 wt %, still more preferably 10 to 50 wt %, and particularly preferably 10 to 40 wt %; the propylene/butene/ethylene copolymer (B1) at 5 to 85 wt %, preferably 10 to 80 wt %, more preferably 10 to 70 wt %, still more preferably 15 to 55 wt %, and particularly preferably 20 to 50 wt %; the elastomer (C) at 0 to 40 wt %, preferably 0 to 30 wt %, more preferably 0 to 25 wt %, still more preferably 5 to 20 wt %, and particularly preferably 5 to 15 wt %; and the inorganic filler (D) at 15 to 80 wt %, preferably 20 to 70 wt %, more preferably 25 to 70 wt %, still more preferably 30 to 60 wt %, and particularly preferably 35 to 60 wt % (the total of (A), (B), (C) and (D) is 100 wt %). The use of the isotactic propylene polymer (A1) in the above amount leads to further improved heat resistance and mechanical properties.

The propylene resin composition 2 contains the syndiotactic propylene polymer (A2) at 0 to 80 wt %, preferably 0 to 70 wt %, more preferably 5 to 60 wt %, still more preferably 10 to 50 wt %, and particularly preferably 10 to 40 wt %; the propylene/ethylene copolymer (B2) at 5 to 85 wt %, preferably 10 to 80 wt %, more preferably 10 to 70 wt %, still more preferably 15 to 55 wt %, and particularly preferably 20 to 50 wt %; the elastomer (C) at 0 to 40 wt %, preferably 0 to 30 wt %, more preferably 0 to 25 wt %, still more preferably 5 to 20 wt %, and particularly preferably 5 to 15 wt %; and the inorganic filler (D) at 15 to 80 wt %, preferably 20 to 70 wt %, more preferably 25 to 70 wt %, still more preferably 30 to 60 wt %, and particularly preferably 35 to 60 wt % (the total of (A), (B), (C) and (D) is 100 wt %). The use of the syndiotactic propylene polymer (A2) in the above amount leads to further improved heat resistance and mechanical properties.

The oil (E) may be used in an amount of 0.1 to 20 parts by weight, preferably 0.1 to 10 parts by weight, and more preferably 0.1 to 8 parts by weight based on 100 parts by weight of the total of (A), (B), (C) and (D). The oil (E) used in this amount provides markedly improved low-temperature properties and reduces the probability of the bleeding of oil from the surface of shaped articles.

When the graft modified polymer (F) is used, the propylene resin composition 1 contains the isotactic propylene polymer (A1) at 0 to 80 wt %, preferably 0 to 70 wt %, more preferably 5 to 60 wt %, still more preferably 10 to 50 wt %, and particularly preferably 10 to 40 wt %; the propylene/butene/ethylene copolymer (B1) at 5 to 85 wt %, preferably 5 to 80 wt %, more preferably 5 to 65 wt %, still more preferably 5 to 55 wt %, and particularly preferably 5 to 45 wt %; the elastomer (C) at 0 to 40 wt %, preferably 0 to 30 wt %, more preferably 0 to 25 wt %, still more preferably 0 to 20 wt %, and particularly preferably 0 to 15 wt %; the inorganic filler (D) at 15 to 80 wt %, preferably 20 to 70 wt %, more preferably 25 to 70 wt %, still more preferably 30 to 60 wt %, and particularly preferably 35 to 60 wt % (the total of (A), (B), (C) and (D) is 100 wt %); and the graft modified polymer (F) at 0.1 to 10 parts by weight, and preferably 0.1 to 8 parts by weight based on 100 parts by weight of the total of (A), (B), (C) and (D). The graft modified polymer (F) used in this amount provides markedly improved scratch resistance and the obtainable composition shows excellent flowability.

When the graft modified polymer (F) is used, the propylene resin composition 2 contains the syndiotactic propylene polymer (A2) at 0 to 80 wt %, preferably 0 to 70 wt %, more preferably 5 to 60 wt %, still more preferably 10 to 50 wt %, and particularly preferably 10 to 40 wt %; the propylene/ethylene copolymer (B2) at 5 to 85 wt %, preferably 5 to 80 wt %, more preferably 5 to 65 wt %, still more preferably 5 to 50 wt %, and particularly preferably 5 to 40 wt %; the elastomer (C) at 0 to 40 wt %, preferably 0 to 30 wt %, more preferably 0 to 25 wt %, still more preferably 0 to 20 wt %, and particularly preferably 0 to 15 wt %; the inorganic filler (D) at 15 to 80 wt %, preferably 20 to 70 wt %, more preferably 25 to 70 wt %, still more preferably 30 to 60 wt %, and particularly preferably 35 to 60 wt % (the total of (A), (B), (C) and (D) is 100 wt %); and the graft modified polymer (F) at 0.1 to 30 parts by weight, preferably 0.1 to 10 parts by weight, and more preferably 0.1 to 8 parts by weight based on 100 parts by weight of the total of (A), (B), (C) and (D) The graft modified polymer (F) used in this amount provides markedly improved scratch resistance and the obtainable composition shows excellent flowability.

The propylene resin compositions may contain other synthetic resins, rubbers and additives as required while still achieving the objects of the invention. Exemplary additives include antioxidants, heat stabilizers, weathering stabilizers, slip agents, antiblocking agents, nucleating agents, pigments, hydrochloric acid absorbents and copper inhibitors. The amounts of the synthetic resins, rubbers and additives are not particularly limited as long as the objects of the invention are satisfied. In a preferred embodiment, the propylene composition contains 60 to 100 wt %, and preferably 80 to 100 wt % of the components (A), (B), (C) and (D), and the remaining percentage of the synthetic resins, rubbers, additives, oils (E) or graft modified polymers (F).

Processes for Producing Propylene Resin Compositions

The propylene resin compositions may be produced by known methods. For example, the compositions may be prepared by melt-kneading the aforementioned components.

The propylene resin composition containing the graft modified polymer (F) may be manufactured by melt kneading the soft propylene copolymer (B) and the graft modified polymer (F) to produce a propylene polymer composition (G), and melt kneading the propylene polymer composition (G) with the inorganic filler (D) and optionally with the propylene polymer (A) and optionally with one or more elastomers (C) selected from the ethylene elastomers (C1) and the styrene elastomers (C2). This process is advantageous in that the obtainable resin composition achieves improved scratch resistance while maintaining other properties.

Part of the component (B) or (F) may be supplied in a manner similar to the component (A) and others, namely, may be added separately from the propylene polymer composition (G) (melt kneaded product) without being melt-kneaded beforehand. However, the highest effects are obtained when all the components (B) and (F) are formed into the propylene polymer composition (G) (melt-kneaded product).

Propylene Polymer Compositions (G')

A propylene polymer composition (G') according to the present invention contains the propylene polymer (B) and the graft modified polymer (F). The amount of (B) is 99 to 14 parts by weight, and the amount of (F) is 1 to 86 parts by weight (the total of (B) and (F) is 100 parts by weight). Particularly preferably, the amount of (B) is 99 to 50 parts by weight, and the amount of (F) is 1 to 50 parts by weight. The weight ratio between (B) and (F) in the propylene polymer composition (G') may be controlled in accordance with the desired ratio of (B) and (F) in the propylene resin composition. For example, the propylene resin composition (G') may be produced by melt-kneading the components (B) and (F).

Shaped Articles

Shaped articles of the invention are obtained from the propylene resin compositions as described above. The propylene resin compositions may be formed into various shapes by known melt-forming processes. The melt-forming processes are for example extrusion, rotational molding, calendering, injection molding, compression molding, transfer molding, powder molding, blow molding and vacuum forming. The shaped articles may form composites together with shaped articles of other materials, for example, multilayer structures.

The shaped articles may be suitably used as electric wire coverings such as electric wire insulators and electric wire sheaths. The coverings such as electric wire insulators and electric wire sheaths may be formed on the peripheral surface of electric wires by conventional methods such as extrusion.

Electric wires according to the present invention have insulators and/or sheaths formed from the propylene resin compositions. In particular, the electric wires are preferably automotive electric wires or appliance electric wires.

The propylene resin compositions may be also used as building materials.

EXAMPLES

The present invention will be described in greater detail based on examples hereinbelow without limiting the scope of the invention.

[Components]

(a-1) Isotactic Polypropylene (iPP)

An isotactic polypropylene (a-1) had the following properties:

Ethylene content: 3.0 mol %, 1-butene content: 1.0 mol %, MFR (230° C.): 7 g/10 min, melting point: 140° C., mmmm fraction: 98%, Mw/Mn: 4.8

(a-2) Syndiotactic Polypropylene (sPP)

A syndiotactic polypropylene (a-2) had the following properties:

Propylene content: at least 99.9 mol %, MFR (230° C.): 2.0 g/10 min, melting point (lower temperature side/higher temperature side): 152° C./158° C., Mw/Mn: 2.0, rrrr fraction: 94%

[Production of sPP (a-2)]

A thoroughly nitrogen-purged 3 m$^3$ reaction vessel was charged with 1000 L of n-heptane, and 610 ml (0.93 mol) of a toluene solution of methylaluminoxane (Al=1.53 mol/l) was added dropwise at normal temperature. Separately, a magnetic stirrer was placed in a thoroughly nitrogen-purged 5-liter side arm flask, and the flask was charged with 610 ml (0.93 mol) of a toluene solution of methylaluminoxane (Al=1.53 mol/l) and then with a toluene solution of 1.30 g (1.86 mmol) of dibenzylmethylene(cyclopentadienyl) (3,6-di-tert-butylfluorenyl)zirconium dichloride, followed by stirring for 20 minutes. The resultant solution was added to the reaction vessel, and 3200 NL of hydrogen was supplied at 19 Nm$^3$/h in 10 minutes. Thereafter, polymerization was initiated while supplying propylene at 65 kg/h and hydrogen at a rate such that the concentration thereof in the gas phase in the reaction vessel was 57 mol % (the total of propylene and hydrogen in the gas phase was 100 mol %). The polymerization was carried out at 25° C. for 4 hours while keeping the hydrogen concentration in the gas phase in the reaction vessel at 57 mol % as well as continuously supplying propylene at 65 kg/h. The polymerization was terminated by addition of a small amount of diethylene glycol monoisopropyl ether. The polymer formed was washed with 1.8 m$^3$ of heptane and was vacuum dried at 80° C. for 15 hours, resulting in 100 kg of the polymer.

(b-1) Propylene/Butene/Ethylene Copolymer (PBER)

A propylene/butene/ethylene copolymer (b-1) had the following properties:

Ethylene content: 10 mol %, 1-butene content: 28 mol %, Tm: not observed, MFR (230° C.): 1.2 g/10 min, Mw/Mn: 2.0

[Production of PBER (b-1)]

A thoroughly nitrogen-purged 2000 ml polymerization reactor was charged with 833 ml of dry hexane, 120 g of 1-butene, and triisobutylaluminum (1.0 mmol) at normal temperature. The internal temperature of the polymerization reactor was increased to 65° C., and the pressure in the system was increased to 0.33 MPa with propylene and then to 0.62 MPa with ethylene. Separately, di(p-chlorophenyl)methylene (cyclopentadienyl)(octamethyloctahydrodibenzofluorenyl) zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.002 mmol of zirconium atoms (accordingly 0.6 mmol of aluminum atoms) was collected and added to the polymerization reactor. Polymerization was then performed at an internal temperature of 65° C. for 20 minutes while keeping the internal pressure at 0.62 MPa with ethylene. The polymerization was terminated by adding 20 ml of methanol, followed by degassing. The polymer was precipitated from the polymerization solution by pouring the solution to 2 L of methanol, and was vacuum dried at 130° C. for 12 hours. The polymer obtained weighed 73 g.

(b-2) Propylene/Ethylene Copolymer (PER)

A propylene/ethylene copolymer (b-2) had the following properties:

Ethylene content: 18 mol %, Tm: not observed, MFR (230° C.): 0.9 g/10 min, rr fraction: 84%, Mw/Mn: 2.0

[Production of PER (b-2)]

A thoroughly nitrogen-purged 4000 ml polymerization reactor was charged with 1834 ml of dry hexane, and triisobutylaluminum (1.0 mmol) at normal temperature. The internal temperature of the polymerization reactor was increased to 85° C., and the pressure in the system was increased to 0.67 MPa with propylene and then to 1.37 MPa with ethylene. Separately, di(p-chlorophenyl)methylene(cyclopentadienyl) (octamethyloctahydrodibenzofluorenyl)zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.001 mmol of zirconium atoms (accordingly 0.3 mmol of aluminum atoms) was collected and added to the polymerization reactor. Polymerization was then performed at an internal temperature of 85° C. for 10 minutes while keeping the internal pressure at 1.37 MPa with ethylene. The polymerization was terminated by adding 20 ml of methanol, followed by degassing. The polymer was precipitated from the polymerization solution by pouring the solution to 4 L of methanol, and was vacuum dried at 130° C. for 12 hours. The polymer obtained weighed 90 g.

TABLE 1

| | | | Propylene polymer (A) | | Propylene copolymer (B) | |
|---|---|---|---|---|---|---|
| | | | (a-1) | (a-2) | (b-1) | (b-2) |
| Composition | (a) Propylene content | (mol %) | 96 | 100 | 62 | 82 |
| | (b) Ethylene content | (mol %) | 3 | 0 | 10 | 18 |
| | (c) α-olefin content | (mol %) | 1 | 0 | 28 | 0 |
| Melting point (Tm) | | (° C.) | 140 | 152/158 | Not observed | Not observed |
| mmmm | | (%) | 98 | — | — | — |
| rr | | (%) | — | — | — | 84 |
| rrrr | | (%) | — | 94 | — | — |
| [η] | | | 1.9 | 1.8 | 2.1 | 2.3 |
| MFR | | (g/10 min) | 7.0 | 2.0 | 1.2 | 0.9 |
| Mw/Mn | | | 4.8 | 2.0 | 2.0 | 2.0 |

(B') Soft Propylene Polymer (iPBER)

A propylene/ethylene/1-butene random copolymer was used (MFR: 7.2 g/10 min, Tm: not observed, ethylene content: 14 mol %, 1-butene content: 19 mol %, Mw/Mn: 2.0, Shore A hardness: 45, mm fraction: 92%) (The isotactic triad fraction (mm fraction) was measured by a method descried from p. 21, 1.7 to p. 26, 1.6 of WO 2004/087775.)

[Production of iPBER (B')]

A thoroughly nitrogen-purged 2000 ml polymerization reactor was charged with 917 ml of dry hexane, 85 g of 1-butene, and triisobutylaluminum (1.0 mmol) at normal temperature. The internal temperature of the polymerization reactor was increased to 65° C., and the pressure in the system was increased to 0.77 MPa with propylene and then to 0.78 MPa with ethylene. Separately, dimethylmethylene(3-tert-butyl-5-methylcyclopentadienyl)fluorenylzirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.002 mmol of zirconium atoms (accordingly 0.6 mmol of aluminum atoms) was collected and added to the polymerization reactor. Polymerization was then performed at an internal temperature of 65° C. for 20 minutes while keeping the internal pressure at 0.78 MPa with ethylene. The polymerization was terminated by adding 20 ml of methanol, followed by degassing. The polymer was precipitated from the polymerization solution by pouring the solution to 2 L of methanol, and was vacuum dried at 130° C. for 12 hours. The polymer obtained weighed 60.4 g.

(C) Elastomers (C-I) Styrene Elastomer (SEBS)

G1650 manufactured by Kraton Polymers LLC was used.

(C-II) Ethylene/1-Butene Copolymer (EBR)

EBR used had a density of 870 kg/m$^3$, Tm of 53° C., MFR (230° C.) of 7.0 g/10 min, and Mw/Mn of 2.1.

(D) Inorganic Filler

Magnesium hydroxide (Mg(OH)$_2$) KISUMA 5P manufactured by Kyowa Chemical Industry Co., Ltd. was used.

(E) Oils (E-I) Paraffin Oil

PW-90 manufactured by Idemitsu Kosan Co., Ltd. (kinematic viscosity at 40° C.=90 cst) was used.

(E-II) Silicon Oil

SH-200 (500 CS) manufactured by Dow Corning Toray Co., Ltd. was used.

(F) Graft Modified Polymer (m-EBR)

An ethylene/1-butene copolymer (F-I) was modified to give a maleic anhydride-graft modified ethylene/1-butene copolymer (m-EBR) (F-II). The ethylene/1-butene copolymer (F-I) had a density of 885 kg/m$^3$, MFR (230° C.) of 1.0 g/10 min, and Mw/Mn of 2.1.

[Production of m-EBR (F-II)]

An ethylene/1-butene copolymer (F-I) was produced with a metallocene catalyst, and the copolymer had properties as shown in Table 1. 10 kg of the copolymer was blended in a Henschel mixer with a solution of 50 g and 3 g of maleic anhydride and di-tert-butyl peroxide, respectively, in 50 g of acetone.

The blend was supplied through a hopper to a single-screw extruder having a screw diameter of 40 mm and a L/D ratio of 26 and was extruded at a resin temperature of 260° C. and an output of 6 kg/h into a strand. The strand was cooled with water and was pelletized. Maleic anhydride-graft modified ethylene/1-butene copolymer (m-EBR) (F-II) was thus obtained.

The graft modified ethylene/1-butene copolymer (m-EBR) (F-II) was treated with acetone to extract unreacted maleic anhydride, and the maleic anhydride grafted in the copolymer was quantitatively determined to be 0.43 wt %.

(G) Propylene Polymer Compositions (Corresponding to Propylene Polymer Compositions (G'))

A propylene polymer composition (G-I) was produced by kneading the propylene polymer (A), the soft propylene copolymer (B) and the graft modified copolymer at 190° C. with use of Labo Plastomill manufactured by Toyo Seiki Seisaku-Sho, Ltd. The composition contained 16 wt % of the isotactic polypropylene (iPP) (A-I), 64 wt % of the propylene/butene/ethylene copolymer (sPBER) (B-I) and 20 wt % of the maleic anhydride-graft modified ethylene/1-butene copolymer (m-EBR) (F-II). (Table 2)

TABLE 2

| A-I | iPP | 16 wt % |
| B-I | sPBER | 64 wt % |
| F-I | m-EBR | 20 wt % |

A propylene polymer composition (G-II) was produced by kneading the propylene polymer (A), the soft propylene copolymer (B) and the graft modified copolymer at 190° C. with use of Labo Plastomill manufactured by Toyo Seiki Seisaku-Sho, Ltd. The composition contained 16 wt % of the syndiotactic polypropylene (sPP) (A-II), 64 wt % of the propylene/ethylene copolymer (sPER) (B-II) and 20 wt % of the maleic anhydride-graft modified ethylene/1-butene copolymer (m-EBR) (F-II). (Table 3)

TABLE 3

| A-II | sPP | 16 wt % |
| B-II | sPER | 64 wt % |
| F-II | m-EBR | 20 wt % |

Measurement and Calculation of Properties of Materials (1) Comonomer (Ethylene, 1-Butene) Contents, and Stereoregularity (m, rr and rrrr Fractions)

The comonomer (ethylene, 1-butene) contents and stereoregularity (m, rr and rrrr fractions) were determined by analyzing a $^{13}$C-NMR spectrum.

(2) MFR

MFR was determined at 190° C. or 230° C. under 2.16 kg load in accordance with ASTM D 1238.

(3) Melting Point (Tm)

The melting point (Tm) was obtained by determining a temperature at the highest peak of the heat of fusion in exothermic and endothermic curves recorded during a heating process in DSC. In the DSC measurement, a sample was packed into an aluminum pan, and (i) the temperature was raised to 200° C. at a rate of 100° C./min and held at 200° C. for 5 minutes, (ii) the temperature was then lowered to −150° C. at a rate of 10° C./min, and (iii) the temperature was raised at a rate of 10° C./min. The exothermic and endothermic curves obtained in (iii) were used.

(4) Molecular Weight Distribution (Mw/Mn)

The molecular weight distribution (Mw/Mn) was determined by GPC (gel permeation chromatography) using orthodichlorobenzene solvent (mobile phase) and polystyrene standards at a column temperature of 140° C.

(5) Density

The density was measured in accordance with ASTM D 1505.

In Examples, properties were measured or calculated by the following methods.

(1) Mechanical Properties (Breaking Tensile Strength (TS) and Breaking Elongation (EL))

Press sheets 2 mm in thickness were tested in accordance with JIS K 7113-2 to determine the breaking tensile strength (TS), breaking elongation (EL) and Young's modulus (YM).

(2) Hardness (Shore D)

A 2 mm thick sample sheet was tested in accordance with ASTM D 2240 and was allowed to stand at room temperature for 48 hours. The sample was then tested on a D-type measuring device and the hardness (Shore D) was determined by reading the scale immediately after the indenter touched the sample.

(3) Heat Resistance (TMA)

A 2 mm thick sample sheet was tested by allowing a plane indenter 1.8 mm in diameter to press the sheet at 2 kgf/cm$^2$ and increasing the temperature at 5° C./min in accordance with JIS K 7196. A TMA curve was recorded during this process, and the needle penetration temperature (° C.) was determined therefrom as an index of heat resistance (TMA).

(4) Brittle Temperature (BTc)

The brittle temperature (BTc) was determined in accordance with ASTM D 746.

(5) Scratch Resistance (Gloss Retention)

A 2 mm thick specimen was abraded by being rubbed with use of an abrasion tester manufactured by Toyo Seiki Seisaku-Sho, Ltd. and a 45R SUS abrading indenter weighing 470 g that was covered at the tip with a cotton duck No. 10. In detail, the indenter was moved 100 times back and forth at 33 reciprocating motions/min over a stroke of 100 mm at 23° C., and the scratch resistance (gloss retention) was obtained from the gloss before and after the abrading as follows. The higher the value, the higher the scratch resistance.

Gloss retention=100×gloss after abrading/gloss before abrading (6) Abrasion Resistance (Wear Loss)

A sample was abraded with a Taber abrasion tester in accordance with JIS K 7204 wherein the grinding wheel was CS-17, the rotation speed was 60 rpm, the number of testing was 1000 times, and the load was 1000 g. The abrasion resistance (wear loss, mg) was determined based on the weight loss of the sample before and after the test.

(7) Stress Absorption Properties (Impact Resilience)

Four press sheets each 2 mm in thickness were stacked on one another, and a 16 g iron ball was dropped from a height of 50 cm (=$L_0$). The height (=L) to which the iron ball rebounded was measured at 23° C., and the impact resilience (stress absorption properties) was obtained from the following equation:

Impact resilience (%)=$L/L_0$=100

Example 1

A composition as set forth in Table 4 was prepared by kneading with use of Labo Plastomill manufactured by Toyo Seiki Seisaku-Sho, Ltd. The composition was press molded into a 2 mm thick sheet (heating: 190° C.×7 min, cooling: 15° C.×4 min, cooling rate: approximately −40° C./min). The sheet was tested for mechanical properties, hardness, heat resistance, scratch resistance and stress absorption properties as described above. The results are shown in Table 4.

Examples 2-10, Reference Example 1 and Comparative Example 1

Compositions were shaped and tested in the same manner as in Example 1, except that the formulation was changed as described in Table 4. The results are shown in Table 4.

TABLE 4

|  |  |  | Ex. 1 | Ex. 2 | Ex. 3 | Ex. 4 | Ex. 5 | Ex. 6 | Ex. 7 |
|---|---|---|---|---|---|---|---|---|---|
| A-I | iPP | wt % | 15 |  | 13.5 | 13.5 |  |  | 15 |
| A-II | sPP | wt % |  | 15 |  |  | 13.5 | 13.5 |  |
| B-I | sPBER | wt % | 60 |  | 54 | 54 |  |  | 60 |
| B-II | sPER | wt % |  | 60 |  |  | 54 | 54 |  |
| B' | iPBER | wt % |  |  |  |  |  |  |  |
| C-I | SEBS | wt % |  |  | 7.5 |  | 7.5 |  |  |
| C-II | EBR | wt % |  |  |  | 7.5 |  | 7.5 |  |
| D | Mg(OH)$_2$ | wt % | 25 | 25 | 25 | 25 | 25 | 25 | 25 |
| E-I | Paraffin oil | Parts by weight*$^1$ |  |  |  |  |  |  | 2 |
| E-II | Silicon oil | Parts by weight*$^1$ |  |  |  |  |  |  |  |
| Mechanical properties | TS | MPa | 3 | 11 | 4 | 3 | 12 | 10 | 3 |
|  | EL | % | 800< | 800< | 800< | 800< | 800< | 800< | 800< |
| Hardness | Shore D |  | 21 | 24 | 21 | 22 | 23 | 23 | 18 |
| Heat resistance | TMA | ° C. | 106 | 136 | 105 | 105 | 133 | 133 | 104 |
| Scratch resistance | Gloss retention | % | 78 | 86 | 74 | 71 | 81 | 78 | 72 |
| Stress absorption properties | Impact resilience | % | 10 | 9 | 10 | 10 | 11 | 12 | 10 |

|  |  |  | Ex. 8 | Ex. 9 | Ex. 10 | Ref. Ex. 1 | Comp. Ex. 1 |
|---|---|---|---|---|---|---|---|
| A-I | iPP | wt % | 15 |  |  | 15 |  |
| A-II | sPP | wt % |  | 15 | 15 |  |  |
| B-I | sPBER | wt % | 60 |  |  |  |  |
| B-II | sPER | wt % |  | 60 | 60 |  |  |
| B' | iPBER | wt % |  |  |  | 65 |  |
| C-I | SEBS | wt % |  |  |  |  |  |
| C-II | EBR | wt % |  |  |  |  | 75 |
| D | Mg(OH)$_2$ | wt % | 25 | 25 | 25 | 25 | 25 |
| E-I | Paraffin oil | Parts by weight*$^1$ |  | 2 |  |  |  |

TABLE 4-continued

| | | | | | | | |
|---|---|---|---|---|---|---|---|
| E-II | Silicon oil | Parts by weight*1 | 2 | | 2 | | |
| Mechanical properties | TS | MPa | 3 | 8 | 8 | 14 | 5 |
| | EL | % | 800< | 800< | 800< | 800< | 800< |
| Hardness | Shore D | | 19 | 20 | 20 | 22 | 21 |
| Heat resistance | TMA | °C. | 103 | 131 | 132 | 109 | 61 |
| Scratch resistance | Gloss retention | % | 86 | 78 | 88 | 58 | 30 |
| Stress absorption properties | Impact resilience | % | 9 | 9 | 10 | 22 | 36 |

*1Relative to 100 parts by weight of the total of the components A to D

The propylene resin compositions according to the present invention (Examples 1 to 10) showed higher heat resistance, scratch resistance and stress absorption properties compared to the ethylene resin composition of Comparative Example.

Examples 11-14, and Comparative Example 11

Compositions as set forth in Table 5 were prepared by kneading with use of Labo Plastomill manufactured by Toyo Seiki Seisaku-Sho, Ltd. The compositions were each press molded into a 2 mm thick sheet (heating: 190° C.×7 min, cooling: 15° C.×4 min, cooling rate: approximately −40° C./min) The sheets were tested for mechanical properties, hardness, low-temperature properties and abrasion resistance as described above. The results are shown in Table 5.

TABLE 5

| | | | Ex. 11 | Ex. 12 | Ex. 13 | Ex. 14 | Comp. Ex. 11 |
|---|---|---|---|---|---|---|---|
| A-I | iPP | wt % | 30 | | 30 | | 30 |
| A-II | sPP | wt % | | 30 | | 30 | |
| C-I | SEBS | wt % | | | | | |
| C-II | EBR | wt % | | | | | 20 |
| D | Mg(OH)$_2$ | wt % | 50 | 50 | 50 | 50 | 50 |
| G-I | Propylene polymer composition | wt % | 20 | | 20 | | |
| G-II | Propylene polymer composition | wt % | | 20 | | 20 | |
| E-II | Silicon oil | Parts by weight*1 | | | 2 | 2 | |
| Mechanical properties | TS | MPa | 14 | 20 | 13 | 18 | 11 |
| | EL | % | 220 | 280 | 240 | 300 | 80 |
| Hardness | Shore D | | 53 | 54 | 50 | 51 | 56 |
| Low temperature properties | BTc | °C. | −8 | −21 | −23 | −32 | −51 |
| Abrasion resistance | Wear loss | mg | 43 | 39 | 22 | 17 | 117 |

*1Relative to 100 parts by weight of the total of the components A to D

The propylene resin compositions according to the present invention (Examples 11 to 14) showed superior breaking elongation (EL) and abrasion resistance compared to the composition of Comparative Example 11.

Figure 2:
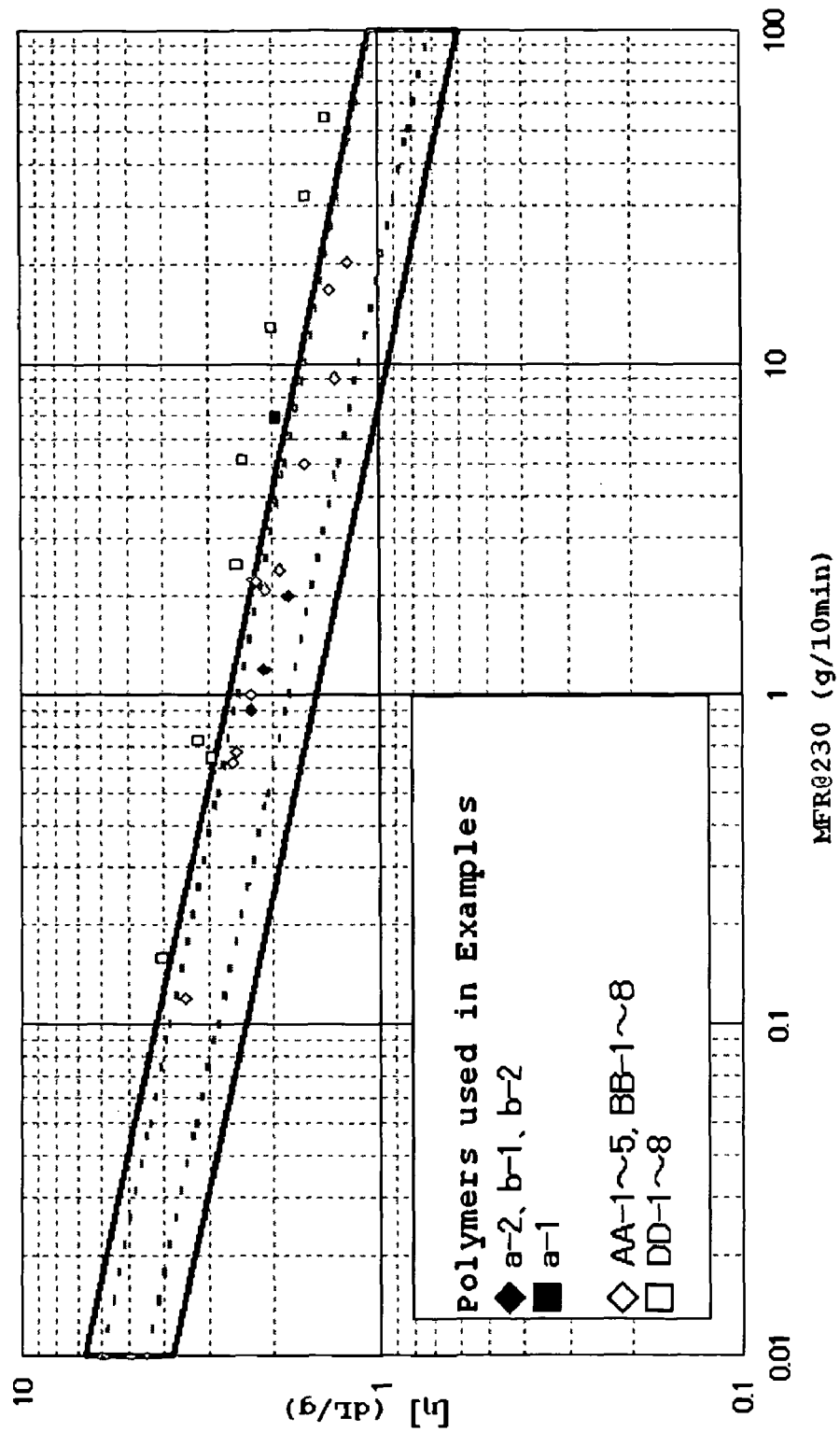
FIG. 2 is a plotted graph showing a relationship between MFR and [η] for polymers belonging to the components (A2) or components (B) and isotactic propylene polymers. The part surrounded by heavy lines indicates a region defined by the requirement (b-2) which is a preferred property of the component (B) of the present invention, and broken lines indicate a preferred range of the requirement (b-2).

FIG. 2 shows a relationship between MFR and [η] for iPP (a-1), sPP (a-2), PBER (b-1), PER (b-2), polymers (AA-1) to (AA-5) and (BB-1) to (BB-8) and isotactic polymers (DD-1) to (DD-8) described below. It is understood from the graph that the components (A2) and (B) according to the invention satisfy the requirement (b-2) while the isotactic polymers do not.

Catalyst Synthesis Example 1

Synthesis of diphenylmethylene(3-tert-butyl-5-ethylcyclo-pentadienyl)(2,7-di-tert-butylfluorenyl)zirconium dichloride (i) Synthesis of 1-ethyl-3-tert-butylcyclopentadiene A 300-ml three-necked flask equipped with a magnetic stirrer and a three-way cock in a nitrogen atmosphere was charged with 200 ml of dehydrated diethyl ether and 52 ml of a 3.0 M diethyl ether solution of ethylmagnesium bromide (154 mmol). In an ice water bath, 17.8 g (129 mmol) of 3-tert-butylcyclopentenone was added dropwise to the flack over a period of 1 hour. The mixture was stirred at room temperature for 20 hours, and the resultant reaction solution was poured into 100 ml of 2N hydrochloric acid. The organic phase was separated, and the aqueous phase was extracted with 50 ml of ether two times. The organic phases were combined and washed two times with a saturated aqueous sodium hydrogencarbonate solution, two times with water, and two times with a saturated salt solution. The product was dried over magnesium sulfate and the solvent was distilled off. The distillate was purified by column chromatography to give 20.2 g of a light yellow transparent liquid (GC purity: 75%). The yield was 78%. The compound was identified by $^1$H-NMR spectroscopy. The results are as follows.

¹H-NMR spectrum (270 MHz, CDCl₃, TMS):
δ/ppm 6.19+6.05+5.81+5.77 (m+m+m+m, 2H), 2.91+2.85 (m+m, 2H), 2.48-2.27 (m, 2H), 1.15-1.08 (s+s+m, 12H)

(ii) Synthesis of 3-tert-butyl-1-ethyl-6,6-diphenylfulvene

A 300-ml three-necked flask equipped with a magnetic stirrer and a three-way cock in a nitrogen atmosphere was charged with 5.11 g (23.9 mmol) of 1-ethyl-3-tert-butylcyclopentadiene (GC purity: 75%) and 150 ml of THF. In a dry ice/methanol bath, 16 ml of a 1.56 M hexane solution of n-butyllithium (25.2 mmol) was slowly added dropwise. The mixture was stirred at room temperature for 20 hours, and 3.1 ml (28.8 mmol) of 1,3-dimethyl-2-imidazolidinone was added and 5.3 g (28.8 mmol) of benzophenone was further added. The mixture was stirred under reflux for 48 hours, and the resultant reaction solution was poured into 100 ml of 2N hydrochloric acid. The organic phase was separated, and the aqueous phase was extracted with 50 ml of hexane two times. The organic phases were combined and washed with a saturated aqueous sodium hydrogencarbonate solution, water and a saturated aqueous sodium chloride solution. The product was dried over magnesium sulfate and the solvent was distilled off. The distillate was purified by column chromatography to give 4.2 g of an orange solid. The yield was 56%. The compound was identified by ¹H-NMR spectroscopy. The results are as follows.

¹H-NMR spectrum (270 MHz, CDCl₃, TMS):
δ/ppm 7.2-7.4 (m, 10H), 6.3 (m, 1H), 5.7 (m, 1H), 1.70+1.85 (q, 2H), 1.15 (s, 9H), 0.85 (t, 3H)

(iii) Synthesis of diphenylmethylene(3-tert-butyl-5-ethylcyclopentadienyl)(2,7-di-tert-butylfluorenyl)

A 200-ml three-necked flask equipped with a magnetic stirrer and a three-way cock was thoroughly purged with nitrogen, and 3.8 g (13.7 mmol) of 2,7-di-tert-butylfluorene was dissolved in 80 ml of dehydrated diethyl ether in the nitrogen atmosphere. In an ice water bath, 9.2 ml of n-butyllithium/hexane solution (1.56 M: 14.3 mmol) was slowly added dropwise to the solution. The mixture was stirred at room temperature for 100 hours, and 4.5 g (14.3 mmol) of 3-tert-butyl-1-ethyl-6,6-diphenylfulvene was added. The mixture was stirred under reflux for 30 hours. The resultant reaction solution was poured into 100 ml of an aqueous 2N hydrochloric acid solution in an ice bath. Subsequently, diethyl ether was added and thereby the organic phase was separated. The aqueous phase was extracted with 50 ml of diethyl ether two times. The organic phases were combined and washed with a saturated aqueous sodium hydrogencarbonate solution, water and a saturated aqueous sodium chloride solution. The product was dried over magnesium sulfate and the solvent was distilled off. The distillate was purified by column chromatography to give 4.2 g of a white solid. The yield was 53%. The compound was identified by field desorption mass spectrometry (FD-MS). The results are as follows.

FD-MS: m/z=592 (M⁺)

(iv) Synthesis of diphenylmethylene(3-tert-butyl-5-ethylcyclopentadienyl)(2,7-di-tert-butylfluorenyl) zirconium dichloride A 100-ml Schlenk flask equipped with a magnetic stirrer chip and a three-way cock was thoroughly purged with nitrogen, and 1.0 g (1.68 mmol) of diphenylmethylene(3-tert-butyl-5-ethylcyclopentadienyl)(2,7-di-tert-butylfluorenyl) was dissolved in 40 ml of dehydrated diethyl ether in the nitrogen atmosphere. In an ice bath, 2.2 ml of a 1.56 M hexane solution of n-butyllithium (3.4 mmol) was slowly added dropwise to the solution. The mixture was stirred at room temperature for 28 hours. The resultant reaction solution was sufficiently cooled in a dry ice/methanol bath, and 0.39 g of zirconium tetrachloride (1.68 mmol) was added. The mixture was stirred for 48 hours while slowly increasing the temperature to ambient, and the solvent was distilled off under reduced pressure. The distillate was re-slurried with hexane and filtered through a glass filter filled with diatomaceous earth. The brown solid on the filter was extracted with a little dichloromethane and was filtered. The thus-obtained hexane solution and dichloromethane solution were distilled under reduced pressure to remove the respective solvents, and the resultant dark orange solids were washed with small amounts of pentane and diethyl ether, respectively, and were dried under reduced pressure. As a result, the target compound was obtained as an orange solid weighing 140 mg (0.186 mmol) The compound was identified by ¹H-NMR spectroscopy and FD-MS. The results are as follows.

¹H-NMR spectrum (270 MHz, CDCl₃, TMS):
δ/ppm 7.90-8.07 (m, 5H), 7.75 (m, 1H), 7.15-7.60 (m, 8H), 6.93 (m, 1H), 6.15-6.25 (m, 2H), 5.6 (d, 1H), 2.05+2.25 (q, 2H), 0.95-1.15 (s+t+s, 30H)

FD-MS: m/z=752 (M⁺)

(Syndiotactic Propylene Polymer (AA-1))

[Polymerization Example AA-1]

Synthesis of Syndiotactic Propylene Polymer (AA-1)

A thoroughly nitrogen-purged 500-ml glass autoclave was charged with 250 ml of toluene, and propylene was supplied at 150 liters/h for 20 minutes at 25° C. Separately, a magnetic stirrer was placed in a thoroughly nitrogen-purged 30-ml side arm flask, and 5.00 mmol of a toluene solution of methylaluminoxane (Al=1.53 mol/l) was added, and 5.0 µmol of a toluene solution of dibenzylmethylene(cyclopentadienyl)(3,6-di-tert-butylfluorenyl)zirconium dichloride was added. The mixture was stirred for 20 minutes. The resultant solution was added to the toluene in the glass autoclave in which propylene had been supplied, and thereby polymerization was initiated. Propylene gas was continuously supplied at 150 liters/h, and the polymerization was performed at 25° C. and atmospheric pressure for 45 minutes and was terminated by addition of a small amount of methanol. The polymer solution was poured into a large excess of methanol to precipitate the polymer. The system was dried under reduced pressure at 80° C. for 12 hours, resulting in 2.38 g of the polymer. The polymerization activity was 0.63 kg-PP/mmol-Zr·hr. The polymer had [η] of 1.9 dl/g, Tm 1 of 152° C., Tm 2 of 158° C., and rrrr fraction of 93.5%. Properties are shown in Table 6.

(Syndiotactic Propylene Polymer (AA-2))

Finaplas 1471 manufactured by Total Petrochemicals (syndiotactic polypropylene, MFR=5.0 g/10 min) was used. Properties are shown in Table 6.

(Syndiotactic Propylene Polymer (AA-3))

[Polymerization Example AA-3]

(Synthesis of Syndiotactic Propylene Polymer (AA-3))

A syndiotactic propylene polymer (AA-3) (propylene homopolymer) was obtained in the same manner as in Polymerization Example AA-1 except that hydrogen was supplied to the polymerization system. The polymer had the same TMA softening temperature, rrrr fraction and Mw/Mn as the polymer (AA-1) and had [η] of 1.4 dl/g. Properties are shown in Table 7.

(Syndiotactic Propylene Polymer (AA-4))

[Polymerization Example AA-4]

(Synthesis of Syndiotactic Propylene Polymer (AA-4))

A propylene homopolymer was obtained in the same manner as in Polymerization Example AA-1 except that hydrogen was supplied to the polymerization system. The polymer had the same TMA softening temperature, rrrr fraction and Mw/Mn as the polymer (AA-1) and had [η] of 1.2 dl/g. Properties are shown in Table 7.

(Syndiotactic Propylene Polymer (AA-5))

Finaplas 1571 manufactured by Total Petrochemicals (syndiotactic polypropylene, MFR=9.1 g/10 min) was used. Properties are shown in Table 7.

(Synthesis of Syndiotactic Propylene Polymer (AA-6))

A thoroughly nitrogen-purged 500-ml glass autoclave was charged with 250 ml of toluene, and propylene was supplied at 150 liters/h for 20 minutes at 25° C. Separately, a magnetic stirrer was placed in a thoroughly nitrogen-purged 30-ml side arm flask, and 5.00 mmol of a toluene solution of methylaluminoxane (Al=1.53 mol/l) was added, and 5.0 μmol of a toluene solution of dibenzylmethylene(cyclopentadienyl)(2,7-diphenyl-3,6-di-tert-butylfluorenyl)zirconium dichloride was added. The mixture was stirred for 20 minutes. The resultant solution was added to the toluene in the glass autoclave in which propylene had been supplied, and thereby polymerization was initiated. Propylene gas was continuously supplied at 150 liters/h, and the polymerization was performed at 25° C. and atmospheric pressure for 10 minutes and was terminated by addition of a small amount of methanol. The polymer solution was poured into a large excess of methanol to precipitate the polymer. The system was dried under reduced pressure at 80° C. for 12 hours, resulting in 6.95 g of the polymer. The polymerization activity was 7.58 kg-PP/mmol-Zr·hr. The polymer had [η] of 2.9 dl/g, Tm of 162.0° C., and rrrr fraction of 95.3%. The above procedures were repeated, and a required amount of the polymer was obtained for use in Example.

(Propylene/α-Olefin Copolymer (BB-1))

[Polymerization Example (BB-1)]

(Synthesis of Propylene/α-Olefin Copolymer (BB-1))

A thoroughly nitrogen-purged 4000 ml polymerization reactor was charged with 1834 ml of dry hexane, and triisobutylaluminum (1.0 mmol) at normal temperature. The internal temperature of the polymerization reactor was increased to 70° C., and the pressure in the system was increased to 0.66 MPa with propylene and then to 1.36 MPa with ethylene. Separately, di(p-chlorophenyl)methylene(cyclopentadienyl)(octamethyloctahydrodibenzofluorenyl)zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.001 mmol of zirconium atoms (accordingly 0.3 mmol of aluminum atoms) was collected and added to the polymerization reactor. Polymerization was then performed at an internal temperature of 70° C. for 15 minutes while keeping the internal pressure at 1.36 MPa with ethylene. The polymerization was terminated by adding 20 ml of methanol, followed by degassing. The polymer was precipitated from the polymerization solution by pouring the solution to 4 L of methanol, and was vacuum dried at 130° C. for 12 hours. The polymer obtained weighed 105 g and had MFR of 0.7 (g/10 min) and [η] at 135° C. in decalin of 2.5 (dl/g). Properties of the polymer are shown in Table 8. The $rr_1$ fraction was 78%.

(Propylene/α-Olefin Copolymer (BB-2))

[Polymerization Example (BB-2)]

(Synthesis of Propylene/α-Olefin Copolymer (BB-2))

A thoroughly nitrogen-purged 4000 ml polymerization reactor was charged with 1834 ml of dry hexane, and triisobutylaluminum (1.0 mmol) at normal temperature. The internal temperature of the polymerization reactor was increased to 70° C., and the pressure in the system was increased to 0.64 MPa with propylene and then to 1.34 MPa with ethylene. Separately, di(p-chlorophenyl)methylene(cyclopentadienyl)(octamethyloctahydrodibenzofluorenyl)zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.001 mmol of zirconium atoms (accordingly 0.3 mmol of aluminum atoms) was collected and added to the polymerization reactor. Polymerization was then performed at an internal temperature of 70° C. for 15 minutes while keeping the internal pressure at 1.34 MPa with ethylene. The polymerization was terminated by adding 20 ml of methanol, followed by degassing. The polymer was precipitated from the polymerization solution by pouring the solution to 4 L of methanol, and was vacuum dried at 130° C. for 12 hours. The polymer obtained weighed 109 g and had MFR of 0.6 (g/10 min) and [η] at 135° C. in decalin of 2.6 (dl/g). Properties of the polymer are shown in Table 8. The $rr_1$ fraction was 76%.

(Propylene/α-Olefin Copolymer (BB-3))

[Polymerization Example (BB-3)]

(Synthesis of Propylene/α-Olefin Copolymer (BB-3))

A thoroughly nitrogen-purged 4000 ml polymerization reactor was charged with 1834 ml of dry hexane, and triisobutylaluminum (1.0 mmol) at normal temperature. The internal temperature of the polymerization reactor was increased to 70° C., and the pressure in the system was increased to 0.67 MPa with propylene and then to 1.37 MPa with ethylene. Separately, di(p-chlorophenyl)methylene(cyclopentadienyl)(octamethyloctahydrodibenzofluorenyl)zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.001 mmol of zirconium atoms (accordingly 0.3 mmol of aluminum atoms) was collected and added to the polymerization reactor. Polymerization was then performed at an internal temperature of 70° C. for 10 minutes while keeping the internal pressure at 1.37 MPa with ethylene. The polymerization was terminated by adding 20 ml of methanol, followed by degassing. The polymer was precipitated from the polymerization solution by pouring the solution to 4 L of methanol, and was vacuum dried at 130° C. for 12 hours. The polymer obtained weighed 90 g and had MFR of 1.0 (g/10 min) and [η] at 135° C. in decalin of 2.3 (dl/g). Properties of the polymer are shown in Table 8. The $rr_1$ fraction was 75%.

(Propylene/α-Olefin Copolymer (BB-4))

[Polymerization Example (BB-4)]

(Synthesis of Propylene/α-Olefin Copolymer (BB-4))

A thoroughly nitrogen-purged 4000 ml polymerization reactor was charged with 1834 ml of dry hexane, 20 g of 1-butene, and triisobutylaluminum (1.0 mmol) at normal temperature. The internal temperature of the polymerization reactor was increased to 70° C., and the pressure in the system was increased to 0.63 MPa with propylene and then to 1.33 MPa with ethylene. Separately, di(p-chlorophenyl)methylene (cyclopentadienyl)(octamethyloctahydrodibenzofluorenyl)zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.001 mmol of zirconium atoms (accordingly 0.3 mmol of aluminum atoms) was collected and added to the polymerization reactor. Polymerization was then performed at an internal temperature of 70° C. for 10 minutes while keeping the internal pressure at 1.33 MPa with ethylene. The polymerization was terminated by adding 20 ml of methanol, followed by degassing. The polymer was precipitated from the polymerization solution by pouring the solution to 4 L of methanol, and was vacuum dried at 130° C. for 12 hours. The polymer obtained weighed 102 g and had MFR of 1.0 (g/10 min) and [η] at 135° C. in decalin of 2.3 (dl/g). Properties of the polymer are shown in Table 8. The $rr_1$ fraction was 75%.

(Propylene/α-Olefin Copolymer (BB-5))

[Polymerization Example (BB-5)]

(Synthesis of Propylene/α-Olefin Copolymer (BB-5))

A thoroughly nitrogen-purged 2000 ml polymerization reactor was charged with 833 ml of dry hexane, 120 g of 1-butene, and triisobutylaluminum (1.0 mmol) at normal temperature. The internal temperature of the polymerization reactor was increased to 60° C., and the pressure in the system was increased to 0.33 MPa with propylene and then to 0.62 MPa with ethylene. Separately, di(p-chlorophenyl)methylene (cyclopentadienyl)(octamethyloctahydrodibenzofluorenyl) zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.002 mmol of zirconium atoms (accordingly 0.6 mmol of aluminum atoms) was collected and added to the polymerization reactor. Polymerization was then performed at an internal temperature of 60° C. for 20 minutes while keeping the internal pressure at 0.62 MPa with ethylene. The polymerization was terminated by adding 20 ml of methanol, followed by degassing. The polymer was precipitated from the polymerization solution by pouring the solution to 2 L of methanol, and was vacuum dried at 130° C. for 12 hours. The polymer obtained weighed 73 g and had [η] at 135° C. in decalin of 2.1 (dl/g). Properties of the polymer are shown in Table 6.

(Propylene/α-Olefin Copolymer (BB-6))

[Polymerization Example (BB-6)]

(Synthesis of Propylene/α-Olefin Copolymer (BB-6))

A thoroughly nitrogen-purged 2000 ml polymerization reactor was charged with 833 ml of dry hexane, 120 g of 1-butene, and triisobutylaluminum (1.0 mmol) at normal temperature. The internal temperature of the polymerization reactor was increased to 60° C., and the pressure in the system was increased to 0.33 MPa with propylene and then to 0.63 MPa with ethylene. Separately, di(p-chlorophenyl)methylene (cyclopentadienyl)(octamethyloctahydrodibenzofluorenyl) zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.002 mmol of zirconium atoms (accordingly 0.6 mmol of aluminum atoms) was collected and added to the polymerization reactor. Polymerization was then performed at an internal temperature of 60° C. for 20 minutes while keeping the internal pressure at 0.63 MPa with ethylene. The polymerization was terminated by adding 20 ml of methanol, followed by degassing. The polymer was precipitated from the polymerization solution by pouring the solution to 2 L of methanol, and was vacuum dried at 130° C. for 12 hours. The polymer obtained weighed 97 g and had [η] at 135° C. in decalin of 2.3 (dl/g). Properties of the polymer are shown in Table 6.

(Propylene/α-Olefin Copolymer (BB-7))

[Polymerization Example (BB-7)]

(Synthesis of Propylene/α-Olefin Copolymer (BB-7))

A thoroughly nitrogen-purged 4000 ml polymerization reactor was charged with 1834 ml of dry hexane, and triisobutylaluminum (1.0 mmol) at normal temperature. The internal temperature of the polymerization reactor was increased to 70° C., and the pressure in the system was increased to 0.67 MPa with propylene and then to 1.37 MPa with ethylene. Separately, di(p-chlorophenyl)methylene(cyclopentadienyl) (octamethyloctahydrodibenzofluorenyl)zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.001 mmol of zirconium atoms (accordingly 0.3 mmol of aluminum atoms) was collected and added to the polymerization reactor. Polymerization was then performed at an internal temperature of 70° C. for 10 minutes while keeping the internal pressure at 1.37 MPa with ethylene. The polymerization was terminated by adding 20 ml of methanol, followed by degassing. The polymer was precipitated from the polymerization solution by pouring the solution to 4 L of methanol, and was vacuum dried at 130° C. for 12 hours. The polymer obtained weighed 90 g and had [η] at 135° C. in decalin of 2.2 (dl/g). Properties of the polymer are shown in Table 6.

(Propylene/α-Olefin Copolymer (BB-8))

[Polymerization Example (BB-8)]

(Synthesis of Propylene/α-Olefin Copolymer (BB-8))

A thoroughly nitrogen-purged 4000 ml polymerization reactor was charged with 1834 ml of dry hexane, and triisobutylaluminum (1.0 mmol) at normal temperature. The internal temperature of the polymerization reactor was increased to 50° C., and the pressure in the system was increased to 0.67 MPa with propylene and then to 1.37 MPa with ethylene. Separately, di(p-chlorophenyl)methylene(cyclopentadienyl) (octamethyloctahydrodibenzofluorenyl)zirconium dichloride was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.001 mmol of zirconium atoms (accordingly 0.3 mmol of aluminum atoms) was collected and added to the polymerization reactor. Polymerization was then performed at an internal temperature of 50° C. for 10 minutes while keeping the internal pressure at 1.37 MPa with ethylene. The polymerization was terminated by adding 20 ml of methanol, followed by degassing. The polymer was precipitated from the polymerization solution by pouring the solution to 4 L of methanol, and was vacuum dried at 130° C. for 12 hours. The polymer obtained weighed 78 g and had [η] at 135° C. in decalin of 3.5 (dl/g). The ethylene content according to $^{13}$C-NMR was 18 mol %. Properties of the polymer are shown in Table 7.

(Propylene Polymer (DD-1))

F102W manufactured by Prime Polymer Co., Ltd. (PP, MFR=2.1 g/10 min) was used.

(Propylene Polymer (DD-2))

J104W manufactured by Prime Polymer Co., Ltd. (PP, MFR=5.2 g/10 min) was used.

(Propylene Polymer (DD-3))

B101 manufactured by Prime Polymer Co., Ltd. (PP, MFR=0.7 g/10 min) was used.

(Propylene Polymer (DD-4))

J106G manufactured by Prime Polymer Co., Ltd. (PP, MFR=15.0 g/10 min) was used.

(Propylene Polymer (DD-5))

J107G manufactured by Prime Polymer Co., Ltd. (PP, MFR=30.0 g/10 min) was used.

(Propylene Polymer (DD-6))

J108M manufactured by Prime Polymer Co., Ltd. (PP, MFR=45.0 g/10 min) was used.

(Propylene Polymer (DD-7))

(Synthesis of Propylene/Ethylene/Butene Copolymer)

A thoroughly nitrogen-purged 4000 ml polymerization reactor was charged with 1834 ml of dry hexane, 110 g of 1-butene, and triisobutylaluminum (1.0 mmol) at normal temperature. The internal temperature of the polymerization reactor was increased to 55° C., and the pressure in the system was increased to 0.58 MPa with propylene and then to 0.75 MPa with ethylene. Separately, diphenylmethylene(3-tert-butyl-5-ethylcyclopentadienyl)(2,7-di-tert-butylfluorenyl) zirconium dichloride synthesized in Catalyst Synthesis Example 1 was mixed with a toluene solution of methylaluminoxane (manufactured by Tosoh Finechem Corporation) to give a toluene solution that contained aluminum atoms and zirconium atoms in an aluminum atom/zirconium atom molar ratio of 300/1. A portion of the toluene solution that contained 0.001 mmol of zirconium atoms (accordingly 0.3 mmol of aluminum atoms) was collected and added to the polymerization reactor. Polymerization was then performed at an internal temperature of 55° C. for 25 minutes while keeping the internal pressure at 0.75 MPa with ethylene. The polymerization was terminated by adding 20 ml of methanol, followed by degassing. The polymer was precipitated from the polymerization solution by pouring the solution to 4 L of methanol, and was vacuum dried at 130° C. for 12 hours. The polymer obtained weighed 120.2 g and had MFR of 0.7 (g/10 min).

(Propylene Polymer (DD-8))

A polymer was obtained under the same conditions as in the production of the propylene polymer (DD-7), except that the polymerization temperature was changed to 40° C. The polymer had the same ethylene and butene contents as the polymer (DD-7) and had [η] of 4.0 and Mw/Mn of 2.1.

Properties of the propylene polymers (DD-1) to (DD-8) are shown in Table 9.

TABLE 6

|  |  |  | Syndiotactic propylene polymer (AA) | | Propylene/ α-olefin copolymer (BB) | | |
|---|---|---|---|---|---|---|---|
|  |  |  | (AA-1) | (AA-2) | (BB-5) | (BB-6) | (BB-7) |
| Composition | (a) Propylene content | (mol %) | 100 | 100 | 66 | 62 | 82 |
|  | (b) Ethylene content | (mol %) | 0 | 0 | 5 | 10 | 18 |
|  | (c) α-olefin content | (mol %) | 0 | 0 | 29 | 28 | 0 |
| Melting point (Tm) |  | (° C.) | 152/158 | 113/125 | — | — | — |
| rrrr |  | (%) | 94 | 69 | — | — | — |
| [η] |  |  | 1.9 | 1.6 | 2.1 | 2.3 | 2.2 |
| MFR |  | (g/10 min) | 2.4 | 5.0 | 1.2 | 0.9 | 1.1 |
| ΔH |  | (mJ/mg) | 62 | 33 | — | — | — |
| Tg |  | (° C.) | −5.7 | −6.5 | −15.2 | −23.7 | −26.8 |
| Mw/Mn |  |  | 2.0 | 2.0 | 2.0 | 2.0 | 2.0 |
| $t_{1/2}$ (110° C.) |  | (sec) | 138 | 22730 |  |  |  |
| Decane soluble content |  | (%) | <0.5 | 25 |  |  |  |

TABLE 7

|  |  | Syndiotactic propylene polymer (A) | | | Propylene/ α-olefin copolymer (B) |
|---|---|---|---|---|---|
|  |  | (AA-3) | (AA-4) | (AA-5) | (BB-8) |
| rr | (%) | — | — | — | 75 |
| MFR | (g/10 min) | 16.8 | 20.3 | 9.1 | 0.1 |
| [η] | (dL/g) | 1.4 | 1.2 | 1.3 | 3.5 |

TABLE 8

|  |  |  | Propylene/α-olefin copolymer | | | |
|---|---|---|---|---|---|---|
|  |  |  | (BB-1) | (BB-2) | (BB-3) | (BB-4) |
| Composition | (a) Propylene content | (mol %) | 77 | 72 | 82 | 68 |
|  | (b) Ethylene content | (mol %) | 23 | 28 | 18 | 27 |
|  | (c) α-olefin content | (mol %) | 0 | 0 | 0 | 5 |

TABLE 8-continued

| | | Propylene/α-olefin copolymer | | | |
|---|---|---|---|---|---|
| | | (BB-1) | (BB-2) | (BB-3) | (BB-4) |
| Melting point (Tm) | (° C.) | — | — | — | — |
| rrrr | (%) | — | — | — | — |
| rr | (%) | 82.9 | 84.6 | 83.5 | 82.1 |
| MFR | (g/10 min) | 0.7 | 0.6 | 1.0 | 1.0 |
| [η] | (dL/g) | 2.5 | 2.6 | 2.3 | 2.3 |
| ΔH | (mJ/mg) | — | — | — | — |
| Tg | (° C.) | −30.1 | −34.9 | −26.8 | −35.4 |
| Mw/Mn | | 2.0 | 2.0 | 2.0 | 2.0 |

TABLE 9

| | | Propylene polymer (D) | | | | | | | |
|---|---|---|---|---|---|---|---|---|---|
| | | (DD-1) | (DD-2) | (DD-3) | (DD-4) | (DD-5) | (DD-6) | (DD-7) | (DD-8) |
| MFR | (g/10 min) | 2.1 | 5.2 | 0.7 | 15.0 | 30.0 | 45.0 | 0.7 | 0.2 |
| [η] | (dL/g) | 2.7 | 2.4 | 3.2 | 1.9 | 1.7 | 1.4 | 2.9 | 4.0 |
| mmmm | (%) | — | — | — | 96 | — | 96 | — | — |

INDUSTRIAL APPLICABILITY

The propylene resin compositions of the invention contain the inorganic fillers at high proportions and show high flexibility as well as excellent mechanical strength, breaking elongation and scratch resistance. Because the propylene resin compositions contain the inorganic fillers at high proportions, they can be widely used as flame-retardant shaped articles such as electric wires and building materials.

The invention claimed is:

1. A propylene resin composition comprising:
   (A2) 5 to 80 wt % of a syndiotactic propylene polymer satisfying the requirement (a) below;
   (B) 5 to 80 wt % of a soft propylene copolymer satisfying the requirement (b) below and having a melting point of less than 100° C. or not showing a melting point in differential scanning calorimetry (DSC);
   (C) 0 to 40 wt % of one or more elastomers selected from ethylene elastomers (C1) and styrene elastomers (C2); and
   (D) 15 to 80 wt % of an inorganic filler (wherein the total of (A2), (B), (C) and (D) is 100 wt %):
   (a) the melting point according to differential scanning calorimetry is not less than 100° C.;
   (b) MFR measured at 230° C. under 2.16 kg load in accordance with ASTM D 1238 is in the range of 0.01 to 100 g/10 min, and at least one of the requirements (b-1) and (b-2) is satisfied:
   (b-1) the syndiotactic triad fraction (rr fraction) as measured by $^{13}$C-NMR is not less than 60%; and
   (b-2) the copolymer contains 55 to 90 mol% of structural units derived from propylene and 10 to 45 mol % of structural units derived from at least one olefin selected from C2-20 α-olefins (excluding propylene) (with the proviso that the total of the structural units derived from propylene and the structural units derived from the C2-20 α-olefin(s) (excluding propylene) is 100 mol %), and an intrinsic viscosity [η] (dL/g) as measured in decalin at 135° C. and the MFR (g/10 min, 230° C., 2.16 kg load) satisfy the following relationship:

$$1.50 \times MFR^{(-0.20)} \leq [\eta] \leq 2.65 \times MFR^{(-0.20)}.$$

2. The propylene resin composition according to claim 1, wherein the syndiotactic propylene polymer (A2) has a melting point of not less than 145° C.

3. The propylene resin composition according to claim 1, wherein the inorganic filler (D) is at least one selected from metal hydroxides, metal carbonates and metal oxides.

4. The propylene resin composition according to claim 1, wherein the propylene resin composition further comprises 0.1 to 20 parts by weight of an oil (E) based on 100 parts by weight of the total of the propylene, polymer (A2) the soft propylene copolymer (B), the elastomer (C) and the inorganic filler (D).

5. The propylene resin composition according to claim 1, wherein the propylene resin composition further comprises 0.1 to 30 parts by weight of a graft modified polymer (F) that is grafted with 0.01 to 10 wt % of a vinyl compound having a polar group (based on 100 wt % of the graft modified polymer (F)), based on 100 parts by weight of the total of the propylene, polymer (A2), the soft propylene copolymer (B), the elastomer (C) and the inorganic filler (D).

6. A process for producing the propylene resin composition according to claim 5, which process comprises melt kneading the soft propylene copolymer (B) and, the graft modified polymer (F) to produce a propylene polymer composition (G); and melt kneading the propylene polymer composition (G) with the inorganic filler (D), with the propylene, polymer (A2) and optionally with the elastomer (C).

7. A propylene polymer composition (G') comprising:
   (B) 99 to 14 parts by weight of a soft propylene copolymer satisfying the requirement (b) below and having a melting point of less than 100° C. or not showing a melting point in differential scanning calorimetry (DSC); and
   (F) 1 to 86 parts by weight of a graft modified polymer that is grafted with 0.01 to 10 wt % of a vinyl compound having a polar group (based on 100 wt % of the graft modified polymer(F)) (wherein the total of (B) and (F) is 100 parts by weight):
   (b) MFR measured at 230° C. under 2.16 kg load in accordance with ASTM D 1238 is in the range of 0.01 to 100 g/10 min, and at least one of the requirements (b-1) and (b-2) is satisfied:
   (b-1) the syndiotactic triad fraction (rr fraction) as measured by $^{13}$C-NMR is not less than 60%; and (b-2) the copolymer contains 55 to 90 mol % of structural units derived from propylene and 10 to 45 mol % of structural units derived from at least one olefin selected from C2-20 α-olefins (excluding propylene) (with the proviso that the total of the structural units derived from propylene and the structural units derived from the C2-20 α-olefin(s) (excluding propylene) is 100 mol %), and an intrinsic viscosity [η] (dL/g) as measured in decalin at 135° C. and the MFR (g/10 min, 230° C., 2.16 kg load) satisfy the following relationship:

$$1.50 \times MFR^{(-0.20)} \leq [\eta] \leq 2.65 \times MFR^{(-0.20)}.$$

8. The propylene polymer composition (G') according to claim 7, which contains 99 to 50 parts by weight of the soft propylene copolymer (B) and 1 to 50 parts by weight of the graft modified polymer (F) (wherein the total of (B) and (F) is 100 parts by weight).

9. A shaped article comprising the propylene resin composition of claim 1.

10. The shaped article according to claim 9, which is an electric wire insulator or an electric wire sheath.

11. An electric wire comprising an insulator and/or a sheath each comprising the propylene resin composition of claim 1.

12. The electric wire according to claim 11, which is an automotive electric wire or an appliance electric wire.

13. The propylene resin composition according to claim 1, which contains:
(A2) 5 to 70 wt % of the syndiotactic propylene polymer,
(B) 5 to 70 wt % of the soft propylene copolymer,
(C) 5 to 20 wt % of one or more elastomers selected from ethylene elastomers (C1) and styrene elastomers (C2) and
(D) 15 to 70 wt % of the inorganic filler (wherein the total of (A2), (B), (C) and (D) is 100 wt %).

14. The propylene resin composition according to claim 2, which contains:
(A2) 5 to 70 wt % of the syndiotactic propylene polymer,
(B) 5 to 70 wt % of the soft propylene copolymer,
(C) 5 to 20 wt % of one or more elastomers selected from ethylene elastomers (C1) and styrene elastomers (C2) and
(D) 15 to 70 wt % of the inorganic filler (wherein the total of (A2), (B), (C) and (D) is 100 wt %).

* * * * *